United States Patent
Gehly

[19]

[11] Patent Number: 5,497,295
[45] Date of Patent: Mar. 5, 1996

[54] LIGHTING SYSTEM

[75] Inventor: Joel C. Gehly, McKean, Pa.

[73] Assignee: Lumitek Development, Inc., Girard, Pa.

[21] Appl. No.: 75,996

[22] Filed: Jun. 14, 1993

[51] Int. Cl.⁶ .................................................. F21V 7/04
[52] U.S. Cl. .................. 362/32; 362/250; 362/405; 362/427; 362/804; 362/293; 362/295
[58] Field of Search .................................. 362/27, 32, 249, 362/250, 282, 283, 147, 404, 405, 406, 407, 427, 804, 293, 295

[56] References Cited

U.S. PATENT DOCUMENTS

| | | | |
|---|---|---|---|
| 3,016,785 | 1/1962 | Kapany. | |
| 3,278,738 | 10/1966 | Clark. | |
| 3,327,712 | 6/1967 | Kaufman et al.. | |
| 3,360,640 | 12/1967 | Seitz et al. | 362/32 X |
| 3,437,803 | 4/1969 | Seitz et al.. | |
| 3,446,952 | 5/1969 | Sitter et al.. | |
| 3,599,922 | 8/1971 | Junginger. | |
| 3,645,254 | 2/1972 | Burton. | |
| 3,786,243 | 1/1974 | Ilzig et al. | 362/32 |
| 3,809,072 | 5/1974 | Ersek et al. | 128/23 |
| 3,959,612 | 5/1976 | Feinbloom | 200/11 R |
| 4,234,910 | 11/1980 | Price | 362/105 |
| 4,281,366 | 7/1981 | Wurster | 362/32 |
| 4,286,839 | 9/1981 | Ilzig et al. | 362/32 X |
| 4,337,502 | 6/1982 | Lescrenier | 362/32 |
| 4,415,952 | 11/1983 | Hattori et al. | 362/32 |
| 4,516,190 | 5/1985 | Kloots | 362/32 |
| 4,597,030 | 6/1986 | Brody et al. | 362/32 |
| 4,605,990 | 8/1986 | Wilder et al. | 362/32 |
| 4,729,070 | 3/1988 | Chiu | 362/33 |
| 4,757,426 | 7/1988 | Scheller et al. | 362/20 |
| 4,825,341 | 4/1989 | Awai | 362/32 |
| 4,843,530 | 6/1989 | Mori et al. | 362/413 |
| 4,855,875 | 8/1989 | Onose et al. | 362/32 |
| 4,943,137 | 7/1990 | Speer | 250/227.11 |
| 4,953,932 | 9/1990 | Mihich | 350/96.15 |
| 4,958,904 | 9/1990 | Rawski | 250/227.11 X |
| 4,973,116 | 11/1990 | Loge et al. | 427/163 X |
| 4,995,712 | 2/1991 | Mori | 362/32 X |
| 5,073,040 | 12/1991 | Guinard | 385/26 |
| 5,076,660 | 12/1991 | Merringer | 385/119 |
| 5,078,466 | 1/1992 | MacCulloch | 385/26 |
| 5,161,874 | 11/1992 | Benes | 362/32 |

Primary Examiner—Stephen F. Husar
Attorney, Agent, or Firm—Frost & Jacobs

[57] ABSTRACT

A high illumination level lighting system. The system comprises a light source module and a lighthead. The light source module is remote from the lighthead. An elongated light piping member has a first end in said light source module and a second end adjacent said light head. Light energy from the light source module is transported by the light piping member to the lighthead which collects the light energy from the second end of the light piping member, controls it and directs it in a desired pattern onto a site to be illuminated. A support assembly is provided for the light head. The support assembly may hold the light head in fixed position, or it may be adjustable so as to hold the light head in adjusted positions. The light source module may be provided with filter elements to eliminate unwanted wave lengths, heat, and to provide color temperature control. A control panel is provided to turn the light source of the light source module on and off, and to control light intensity and color temperature, if desired.

42 Claims, 13 Drawing Sheets

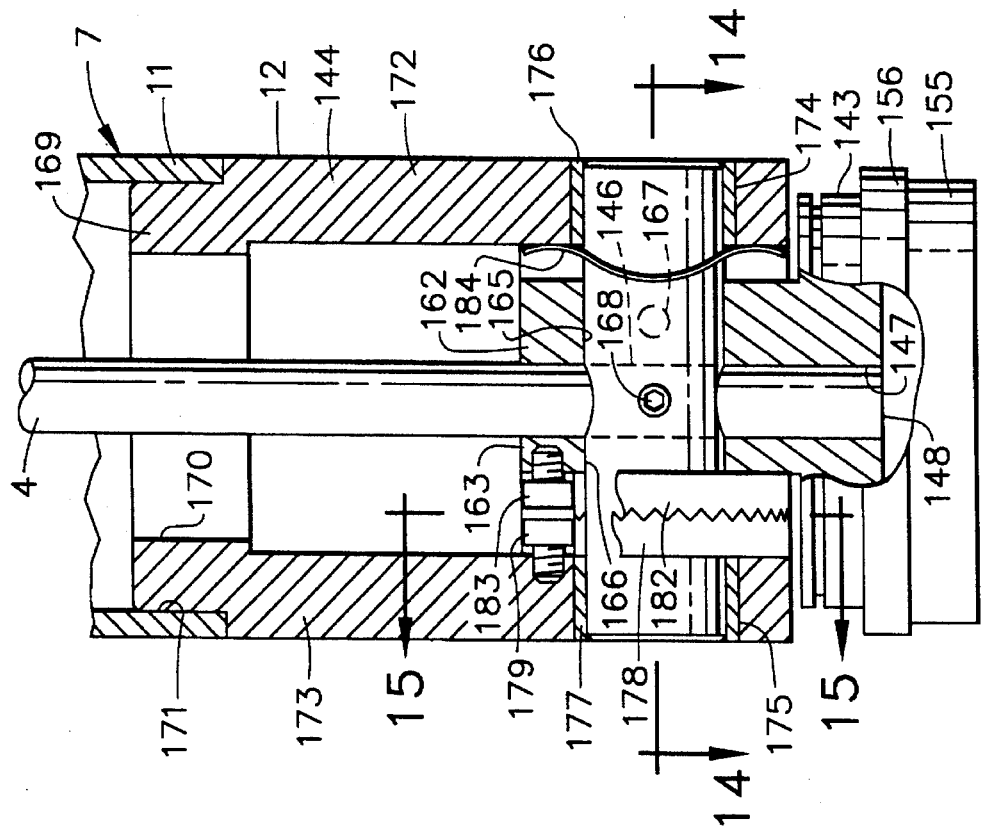
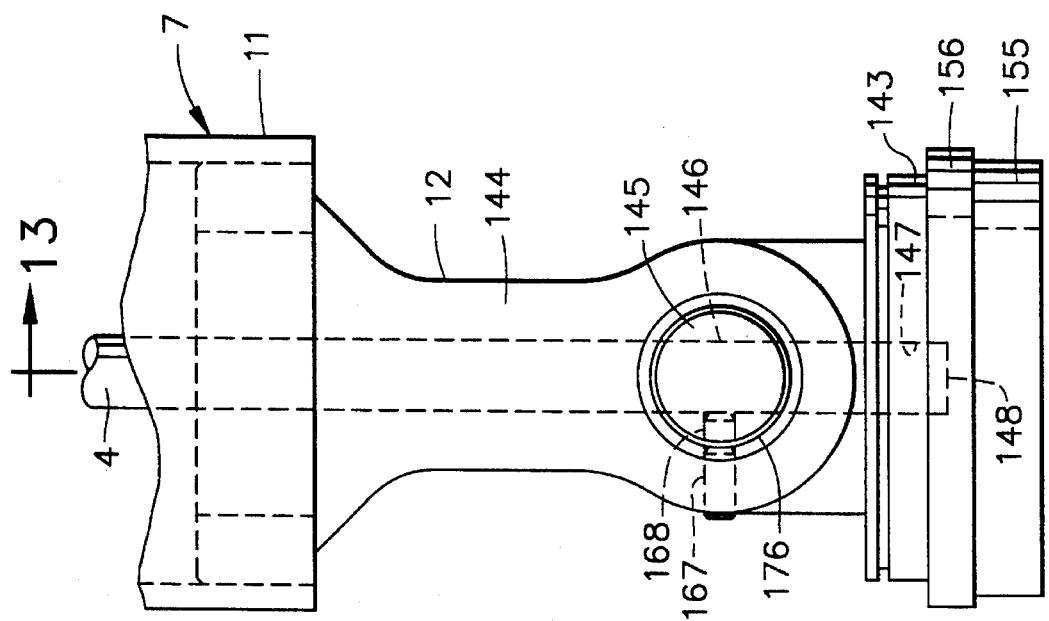
FIG. 13
FIG. 12

LIGHTING SYSTEM

TECHNICAL FIELD

The invention relates to a lighting system of the type having a lighthead which controls and directs a high illumination level light output onto a site to be illuminated, and more particularly to such a system wherein the light source is remote from the lighthead.

BACKGROUND ART

The lighting system of the present invention has many applications, and, in fact, may be used wherever high illumination levels are to be directed upon a designated site. The lighting system is particularly suited for light levels of 1000 lumens or more on a specifically defined task spot or area. The lighting system of the present invention lends itself well, for example, to medical lighting in general, such as doctors' examination lighting, ambulatory surgical lighting, emergency room lighting, dental lighting and the like. The system of the present invention is not limited in its application to medically related fields. For example, the lighting system may also be directed to scientific applications, architectural applications, and the like.

While not intended to be so limited, for purposes of an exemplary showing, the lighting system of the present invention will be described in its application to surgical lighting of the type found in an operating room.

In general, prior art surgical lighting systems comprise a lighthead containing a light source, a suspension system for the lighthead, and a wall mounted control panel for the system. Typically, one or more bulb-type light sources are contained within the lighthead assembly together with light bulb filtration means, control reflectors, refractors and the like. For the most part, there has not been much in the way of dramatic changes in surgical lighting systems from those systems developed in the 1930's and 1940's. Through the years, light bulbs have become smaller. Tungsten-halogen incandescent lamps have been available since the 1960's and 1970's. More technologically advanced filtration systems have also become available.

Despite these advances, the need for extremely high illumination levels at the operating site has resulted in a number of constraints which limit the overall performance of prior art surgical lighting systems. For example, very high wattage lamp sources are being used in the lightheads of surgical lighting systems. This creates problems with respect to the amounts of electrical power that must be conducted into the operating room through the lighting suspension system and into the lighthead.

There are a number of light sources which are extremely efficient, such as a metal halide type arc lamp. Currently, however, arc lamps cannot be used in existing surgical light designs because the power required to start and operate them in the lighthead would be prohibitive from the standpoints of a power delivery, cost, weight and packaging. Typically, metal halide arc lamps require a very high voltage pulse to restart the lamps if there is a momentary power interruption. This high voltage restart requirement is one constraint which currently prohibits these lamps from being placed in current surgical lighting systems.

Another constraint faced by prior art systems is that of heat. The total light energy delivered to the surgical site is limited by the heat energy in the lighthead. Thermal energy exits the lighthead and is directed to the surgical site. Furthermore, the thermal energy creates problems of drying the tissue at the surgical site, and also causes surgeon discomfort. Currently, the most widely used lamp technology (tungsten-halogen lamps) is limited to a maximum of about 250 watts of power because of the total heat generated by the lighthead system. The thermal energy inside the lighthead causes additional problems with components inside the lighthead, and with contact temperatures on the outside surfaces of the lighthead.

The degree of sophistication of filter applications to minimize unwanted wave lengths and thermal heat in the light beam coming out of the lighthead, and to provide various color temperatures of the light beam output for various types of surgeries, is limited by the fact that present day filter systems must be located within the lighthead. This adds weight, bulk, and thermal energy to the lighthead.

Finally, a major constraint limiting overall performance of prior art surgical lighting systems is the size and weight of the overall system, including, in particular, the lighthead. Typical prior art lightheads are very bulky and heavy, many falling within the range of from about 20 to about 30 pounds or more. This fact complicates the suspension and mounting design of the system. In addition, electrical power must be carried through the suspension system to and into the lighthead. The lighthead should move easily, requiring very little effort on the part of the operator. The lighthead should stay in position where it is placed without drift and should be easily adjusted by the surgeon or a circulating nurse. The size, bulk and weight of prior art lightheads make these goals very difficult and very expensive to achieve, requiring large counterbalancing systems and the like.

The size and bulk of current lighting systems also interfere with the crowded ceiling and the overall nature of the operating room. The lighting, air flow system, monitors and other equipment required to be contained within the operating room environment, places a premium on the size and weight and complexity of operating room lighting designs.

The present invention is based upon the discovery that the various constraints and problems outlined above can be overcome by locating the light source remote from the lighthead. Light energy from the light source is transported to the lighthead by light piping material. A light source module will be provided which can be located in a part of the suspension system of the lighting system, in the ceiling of the operating room, or in any location exterior of the operating room. The term "remote" as used herein and the claims is to be interpreted broadly enough to cover all three situations.

Depending upon its location, electrical power limitations are greatly reduced or eliminated. The nature of the light source is not limiting, and use can be made of the highly efficient metal halide arc lamps. There will be virtually no heat associated with the lighthead. As a consequence of all this, regulatory code difficulties with respect to electrical power and heat will be far more easily met.

The remote location of the light source module enables highly sophisticated filter techniques to be employed, since the filter elements need no longer be located in the lighthead. There is no problem in providing a back-up lamp in the light source module, the back-up lamp having the ability to provide identical optical performance to that of the main lamp. This was not always achievable when the back-up lamp was required to be located in the lighthead where optimum location therefor was not always available.

A control panel for the lighting system can be wall mounted, or otherwise appropriately mounted, in the operating room for easy access. The control panel will provide means for turning the lighting system on and off, adjusting the light intensity and, if desired, adjusting color temperature of the light.

The lighthead, in accordance with the practice of the present invention, can be very much thinner and of greatly reduced weight. The lightheads of the present invention will weigh about 10 pounds or less, and preferably about 5 pounds or less. The lightheads taught herein may have a thickness of about two inches or less, as opposed to prior art lightheads having a thickness of 7 to 10 inches, or more. With the light source remote from the lighthead, it is possible to provide a plurality of lightheads provided with quick connect means with respect to the suspension system. The lightheads may differ in size and may be characterized by different light collecting and directing characteristics, as will be described more fully hereinafter. Since the lightheads can be far less bulky and markedly reduced in weight, the suspension systems therefor can be far lighter, less complex and less bulky, large counterweight devices not being needed. Finally, as will be apparent hereinafter, the overall lighting system of the present invention can be far easier and less expensive to manufacture.

DISCLOSURE OF THE INVENTION

According to the invention there is provided a high illumination level lighting system comprising a light source module and a lighthead. The light source module provides at least one light source. The light source module is located remote from the lighthead. An elongated light piping member has a first end connected to the light source module and a second end adjacent the lighthead. Light energy from the light source module is transported by the light piping member to the lighthead. The lighthead collects the light energy from the second end of the light piping member, controls it and directs it in a desired pattern onto a site to be illuminated.

The light source module, in addition to at least one light source, will contain a power supply therefor, an electronic control device, the necessary reflector and lens systems, and filter systems for minimizing or eliminating unwanted wave lengths and thermal energy, as well as for adjusting color temperature, if desired.

The lighthead will be provided with a support system of the type to hold the lighthead in a predetermined fixed position, or of the adjustable type to hold the lighthead in adjusted positions.

The lighting system may be provided with a plurality of lightheads differing in size and characterized by different light collecting and directing characteristics so as to provide different light patterns at the site to be illuminated. The lightheads may be provided with quick connect couplings by which they may be easily and quickly attached and detached from the support assembly.

Finally, the lighting system will be provided with a control panel with which the light source may be turned on and off. The control panel may also provide means for controlling the light intensity and the color temperature of the light, if desired.

BRIEF DESCRIPTION OF THE DRAWINGS

FIG. 12 is a fragmentary side elevational view of an exemplary joint of the suspension system of the present invention.

FIG. 13 is a cross sectional elevational view taken along section line 13—13 of FIG. 12.

DETAILED DESCRIPTION OF THE INVENTION

As indicated above, for purposes of an exemplary showing, the lighting system of the present invention will be described in its application as a surgical lighting system for an operating room. The lighting system of the present invention is particularly well adapted for such an application, although, as has been pointed out, the lighting system has many other applications, as well.

Figure 1:
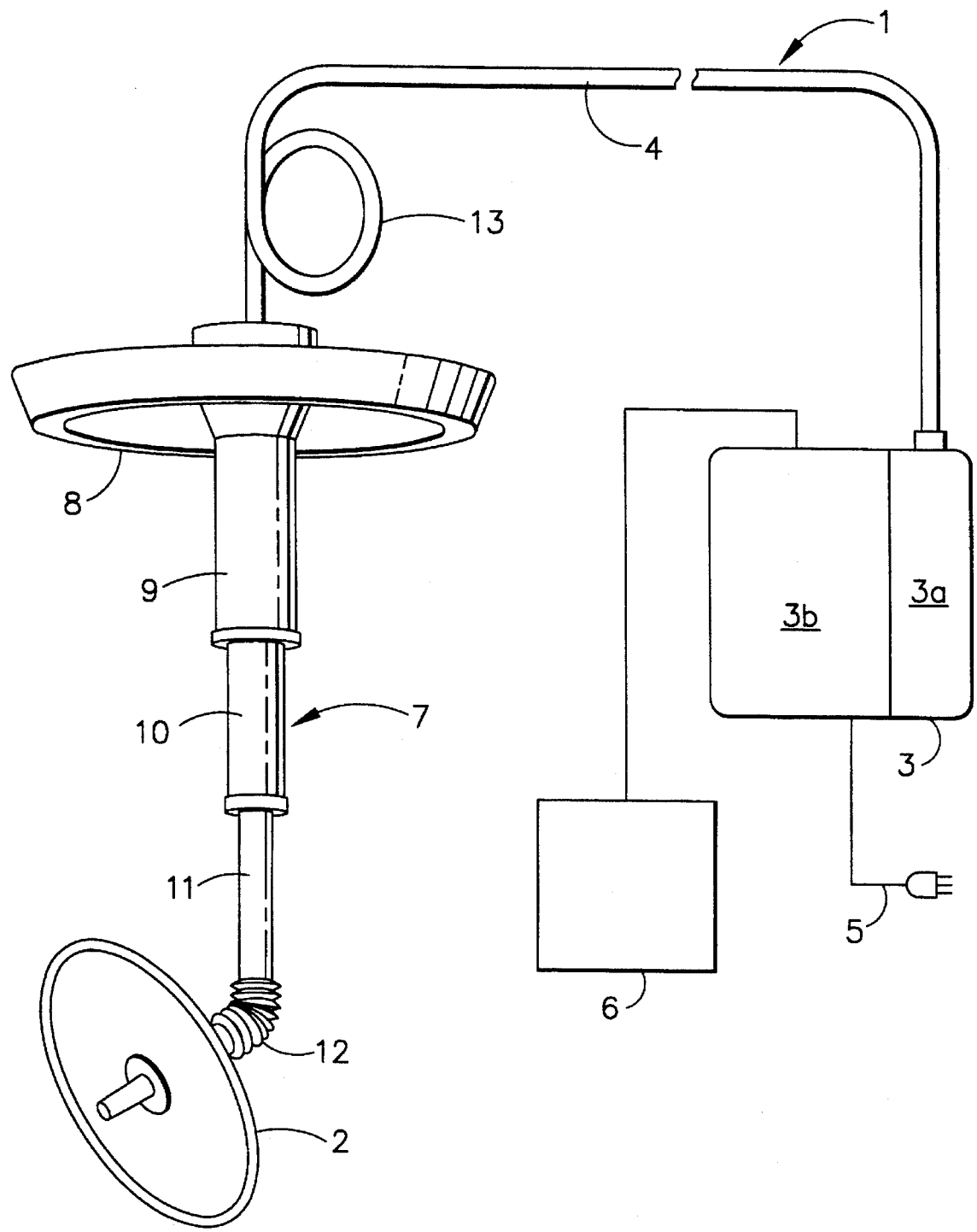
FIG. 1 is a simplified, semi-diagrammatic, fragmentary perspective view of an embodiment of the present invention.

Reference is first made to FIG. 1 wherein a simple embodiment of the present invention is shown. The surgical lighting system is generally indicated at 1. The lighting system of FIG. 1 comprises a lighthead 2, a light source module 3 and an elongated light piping member 4 which extends from the light source module 3 to the lighthead 2.

The light source module 3 will have a first portion 3a which will contain at least one light source, the necessary lens and reflector systems therefor and filter means, all as will be described hereinafter. The light source module 3 will have a second portion 3b which will contain appropriate power supply means and an electronic control means. The light source module portion 3b will be connected to an appropriate power source, as is diagrammatically indicated at 5. The light source module 3 will be provided with an appropriate control panel 6, by which the one or more light sources are turned on and off, and by which such factors as light intensity and color temperature may be adjusted.

The lighting system of FIG. 1 is completed by the provision of an appropriate support assembly (generally indicated at 7) for lighthead 2. The support assembly 7 may take any appropriate form. For example, it could be a fixed support assembly, fixedly mounting lighthead 2 in a predetermined position. Normally, in a surgical lighting system for an operating room, it is desirable to have the lighthead 2 adjustable and capable of maintaining an adjusted position without drift. To this end, an appropriate prior art counterbalance support system could be used. Such a counterbalance system would require some modification, since the lighthead 2 of the present invention is much lighter in weight and smaller in bulk than conventional prior art lightheads, as will be apparent hereinafter. For purposes of an exemplary showing, the support assembly 7 is illustrated as comprising a ceiling mount 8 from which a series of telescoping members depend. While the number of telescoping members does not constitute a limitation of the present invention, FIG. 1 illustrates three telescoping members 9, 10 and 11. The lowermost end of telescoping member 11 is provided with a joint 12, pivotable about a horizontal axis. The lighthead 2 is mounted on the free end of the joint 12. The telescoping members 9, 10 and 11, and the joint 12, as a unit, are preferably rotatable with respect to the ceiling mount 8. The light piping member 4 is flexible and may be looped (as at 13) to accommodate changes in length of the telescoping support assembly 7.

In the embodiment of FIG. 1, it will be understood that the light source module 3 can be located anywhere remote from lighthead 2. The light source module 3 could be located within the operating room at a remote position therein. Alternatively, it could be located outside the operating room, as will be shown hereinafter.

Figure 2:
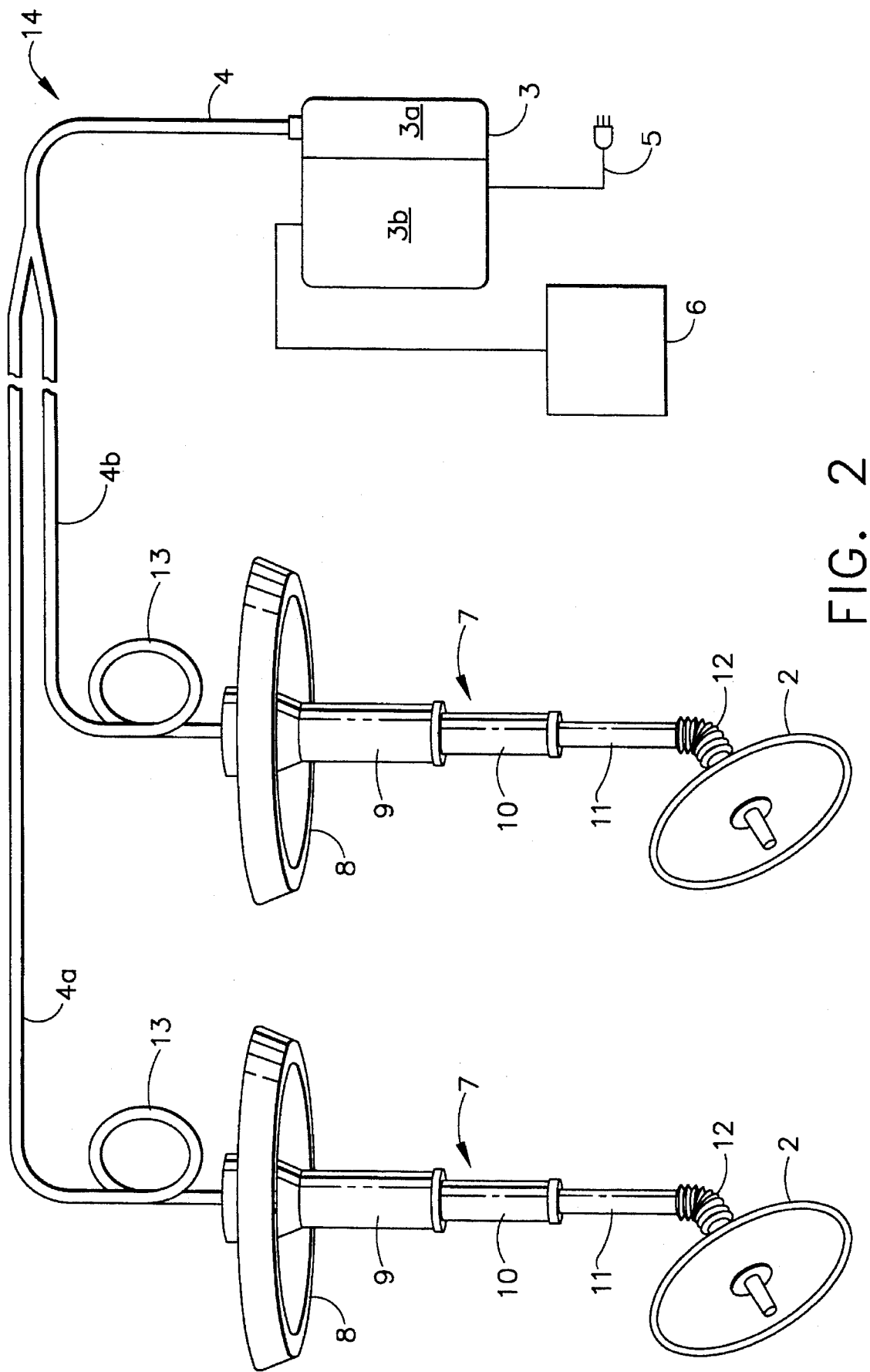
FIG. 2 is a simplified, semi-diagrammatic, fragmentary perspective view of another embodiment of the present invention.

It is not unusual in an operating room to have more than one lighthead. It is preferred that each lighthead be provided with its own light source module 3 and control panel 6 so that the light energy from each lighthead can be individually controlled. In other words, each lighthead 2 would be part of its own lighting system of the type shown in FIG. 1. Where individual light adjustment is not required, an alternative design would utilize a much larger lamp and deliver the necessary light for two or more lightheads from a single light source module. Such a set-up is shown in FIG. 2, wherein like pans have been given like index numerals. In this embodiment, generally indicated at 14, the light piping member 4 is provided with bifurcations 4a and 4b, each leading to one of the lightheads 2.

Figure 3:
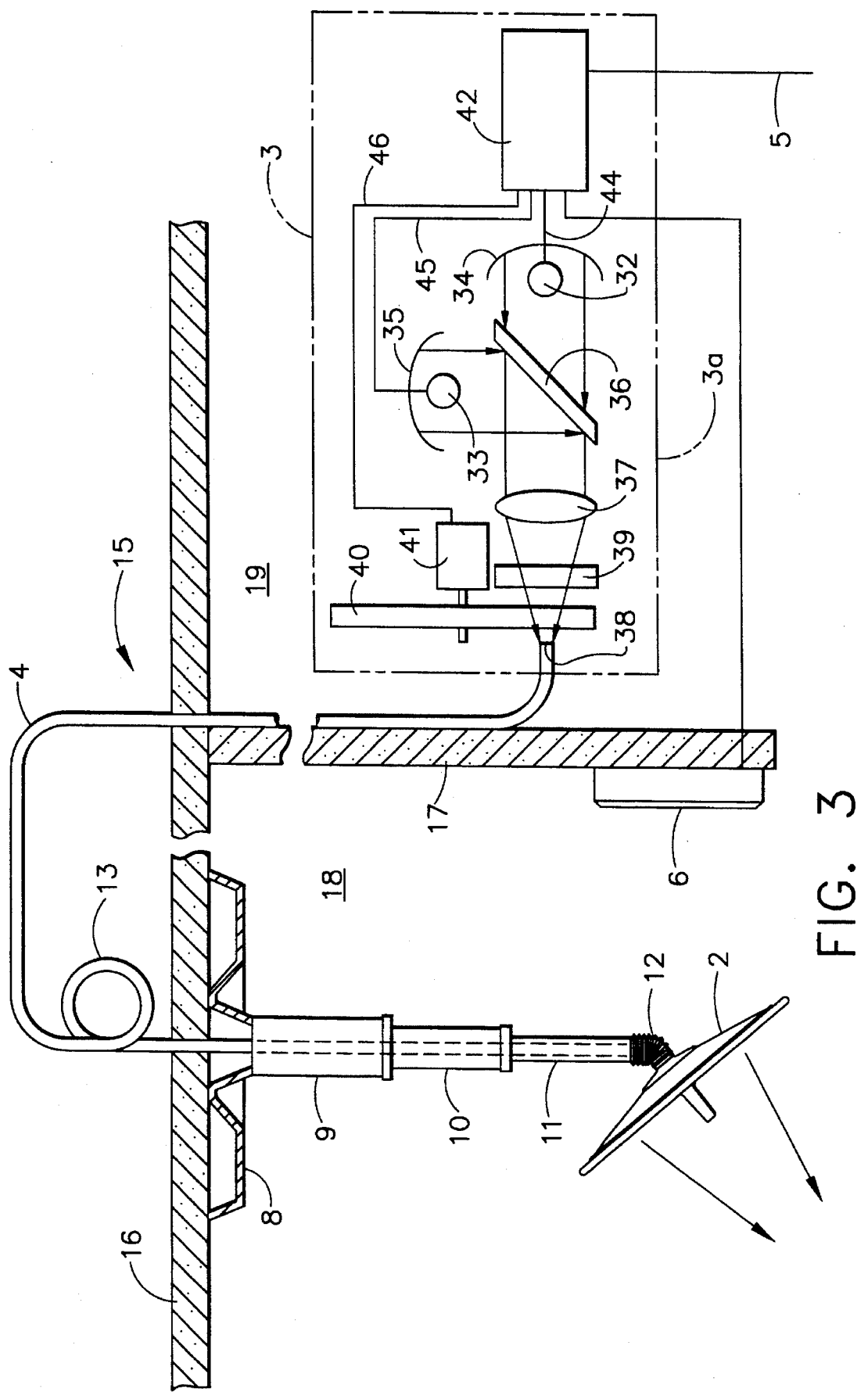
FIG. 3 is a simplified, semi-diagrammatic, fragmentary view, partly in cross section, illustrating another embodiment of the present invention.

FIG. 3 illustrates another embodiment of the present invention, generally indicated at 15. FIG. 3 is similar to FIG. 1, and like pans have been given like index numerals. FIG. 3 is a diagrammatic representation, and illustrates a ceiling 16 and a partition or room wall 17. In this diagrammatic representation, the space to the left of wall 17 constitutes the operating room 18. The space to the right of wall 17 comprises a separate room or corridor 19, adjacent the operating room 18. The embodiment 15 of FIG. 3 differs from the embodiment 1 of FIG. 1 in that the light source module 3 is specifically shown mounted in a room or space 19 outside of the operating room 18. This son of mounting eliminates problems with the high voltage electrical requirements coming into the operating room environment. It will be noted, however, that the control panel 6 is mounted within the operating room at a position conveniently accessible to the doctor or a nurse.

Figure 4:
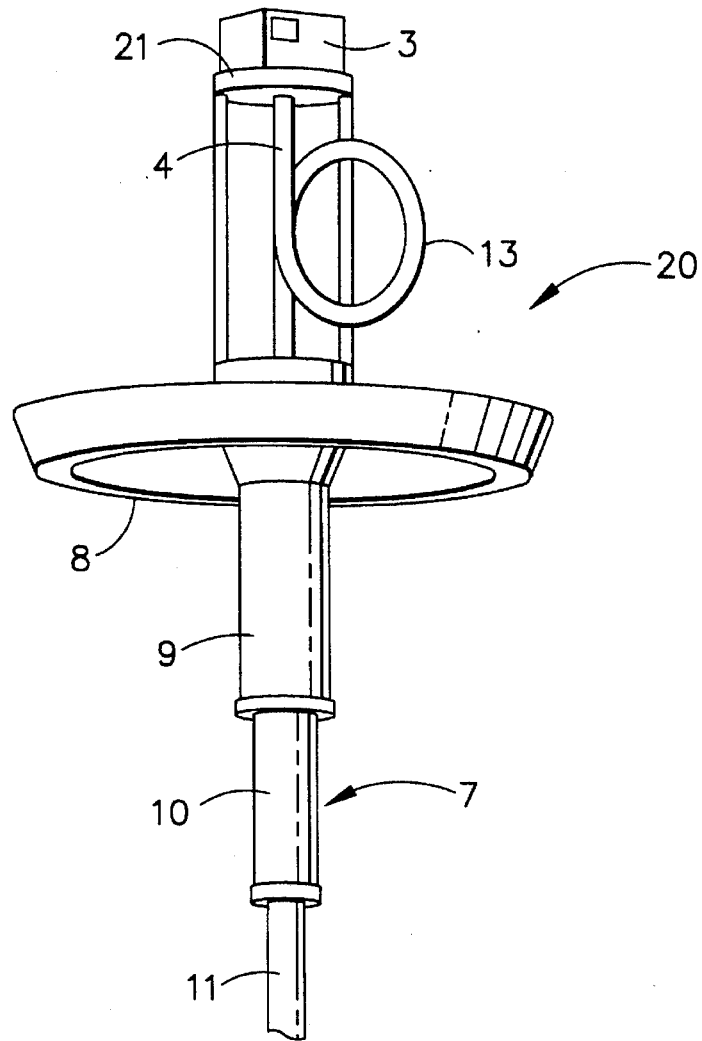
FIG. 4 is a fragmentary perspective view of yet another embodiment of the present invention.

Yet another embodiment of the present invention is illustrated in FIG. 4, and is generally indicated at 20. The embodiment of FIG. 4 is similar to that of FIG. 1 and like parts have been given like index numerals. The embodiment 20 of FIG. 4 differs from the embodiment 1 of FIG. 1 in that the light source module 3 is located above the ceiling of the operating room and is affixed to appropriate support structure 21 extending upwardly from support assembly 7.

Figure 5:
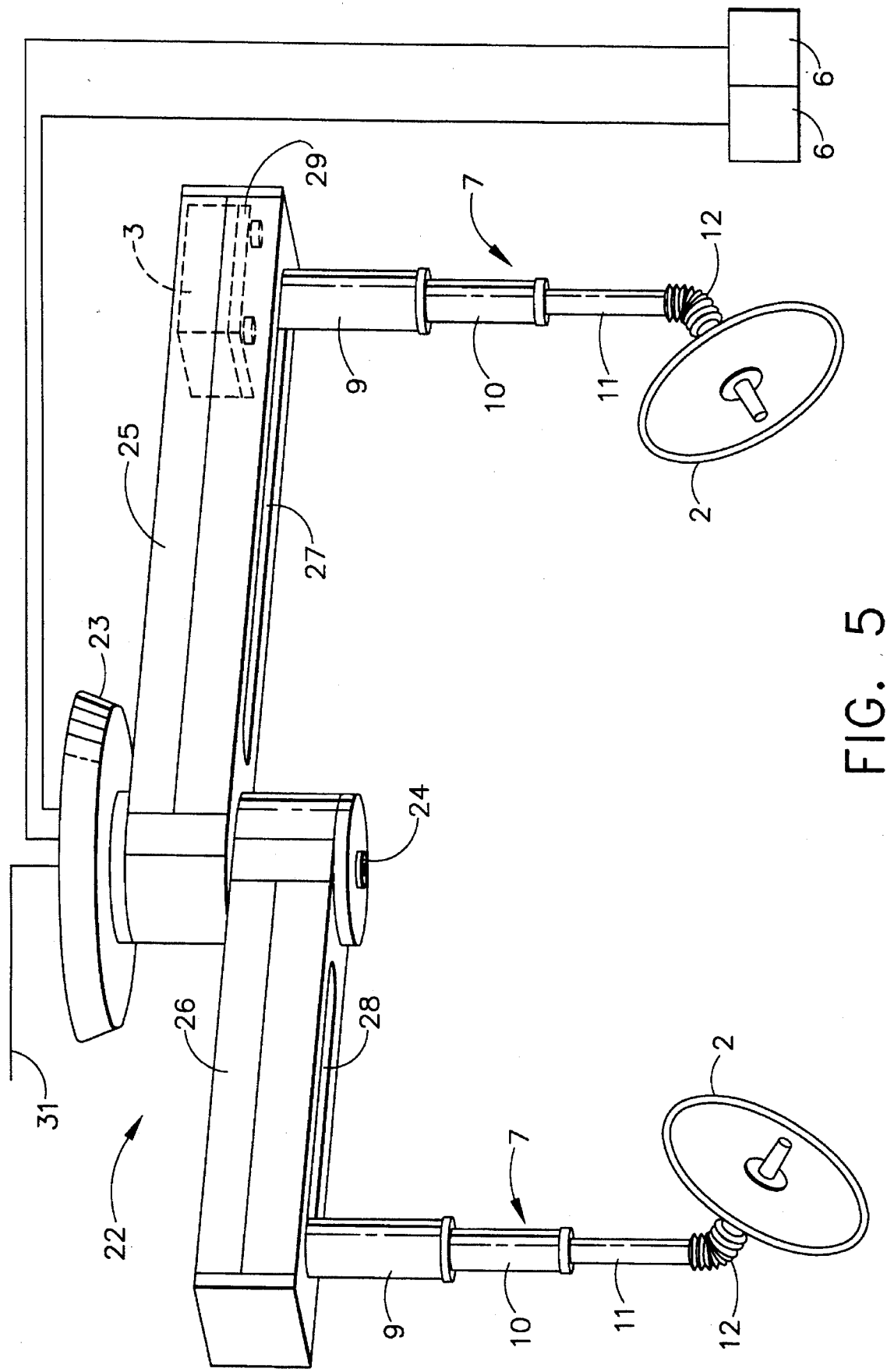
FIG. 5 is a fragmentary, simplified, semi-diagrammatic perspective view of another embodiment of the present invention.

A final embodiment of the surgical lighting system of the present invention, generally indicated at 22, is shown in FIG. 5. In this embodiment, there are two lightheads and two support assemblies substantially identical to those of FIG. 1, and like parts have been given like index numerals. The embodiment 22 is provided with a ceiling mount 23 from which a shaft 24 depends. Rotatively mounted on the shaft 24 there is a pair of horizontally extending arms 25 and 26. The arms 25 and 26 are provided on their lower surfaces with longitudinally extending slots 27 and 28, respectively. The upper portion 9 of the support assembly 7 associated with arm 25 extends through the slot 27 and into the arm 25. The support assembly portion 9 extending through slot 27 is rotatively affixed to a carriage 29 capable of shifting longitudinally along the arm 25. The carriage, in turn, supports the light source module 3 for that lighthead 2 associated with arm 25. Precisely the same arrangement is provided with respect to arm 26 and its respective support assembly 7 and lighthead 2. These arrangements will be described more fully hereinafter with respect to FIGS. 16, 17 and 18. The power supply elements (not shown) for each of the light source modules for the lightheads 2 are connected to an appropriate power source (not shown) by cable 31. A control panel 6 is provided for each of the light source modules for each lighthead 2, as shown. It will be understood that control panels 6 could be merged into a single control panel, if desired.

The embodiments of the surgical lighting system of the present invention illustrated in FIGS. 1–15 are by no means comprehensive. Other arrangements can be made within the scope of the present invention. All of the embodiments are characterized by the light source module being remotely located with respect to the lighthead. In FIG. 1, the light source module is located at a remote position within the operating room. In FIG. 3, the light source module is located outside the operating room. In FIG. 4, the light source module is located above the ceiling of the operating room. In FIG. 2, the light source module could be located in any of the positions indicated in FIGS. 1, 3 and 4. Finally, in FIG. 5, the light source module for each lighthead is located remotely of its respective lighthead and within the support means for its respective lighthead.

Reference is again made to FIG. 3 wherein, in diagrammatic form, an exemplary light source module is shown, suitable for the various embodiments thus far described. In the particular embodiment shown, there are two light sources 32 and 33, each having an appropriate reflector 34 and 35, respectively. As will be understood by one skilled in the art, it would be possible to provide only one light source. Two light sources may be used where particularly high light energy is required. In most instances, however, light source 32 constitutes the main source, and light source 33 constitutes a backup source, should light source 32 fail. Light rays from the reflectors 34 or 35 will be directed by beam splitter 36 to a focusing lens 37 by which they are caused to converge at the end 38 of the light piping member 4.

It will be apparent from FIG. 3 that the main light source 32 and the backup light source 33 will perform identically since there is sufficient room within the light source module 3 to properly locate backup light source 33. It will further be understood by one skilled in the art that the lens system used to focus the beams upon the end 38 of light piping member 4 can take any appropriate form and may be made up of multiple lenses, rather than the single lens 37.

The reflectors 34 and 35 may be coated to reduce or eliminate infrared wave lengths and thereby minimize the thermal heat in the light beam coming out of the lighthead. An ultraviolet filter is indicated at 39. At 40, a rotatable wheel is shown which carries a series of filters by which the color temperature of the light may be adjusted. For example, some surgeons like a yellowish or reddish light beam. Some surgeons, on the other hand, prefer a more bluish or white light beam. The filter wheel 40 enables each surgeon's preference to be accommodated. The filter wheel 40 is driven by a small electric motor 41.

It will be understood by one skilled in the art that the various filter means for infrared and ultraviolet elimination and to control color temperature are exemplary only. Depending upon the size and location of the light source module, highly sophisticated filter systems may be employed, since the filter systems are not required to be located within the lighthead, itself.

The light sources 32 and 33 may be any point source type lamp (incandescent lamp, a high intensity discharge arc lamp, or the like). At the present time, a metal halide type arc lamp is preferred since it is currently one of the most efficient type bulbs available. Removing the bulb from the lighthead permits the use of these extremely efficient lamps. Since the embodiments of the present invention locate the electrical components and the one or more light sources out of the lighthead and into a light source module or container which houses the necessary lamps and electronics in a remote location, the utilization of these highly efficient lamps is no longer precluded.

The portion 3b of the light source module 3 houses the power supply and electronic control device for the light source module. This is shown at 42 in FIG. 3. As indicated above, the electronic control device/power supply 42 is connected to an appropriate power source as at 5. The electronic control device receives signals from control panel 6 via cable 43. The electronic control device has outputs 44, 45 and 46 connected to light sources 34 and 35 and to filter motor 41, respectively. In response to inputs from control panel 6 via cable 43, the electronic control device/power supply 42 will turn the main light source 32 on or off. Should a failure occur with the main light source 32, the electronic control device/power supply 42 will energize back-up light source 33. Furthermore, in response to inputs from control panel 6, the electronic control device/power supply 42 will regulate the intensity of the light source energized, and will operate motor 41, if called for the control panel 6.

Figure 6:
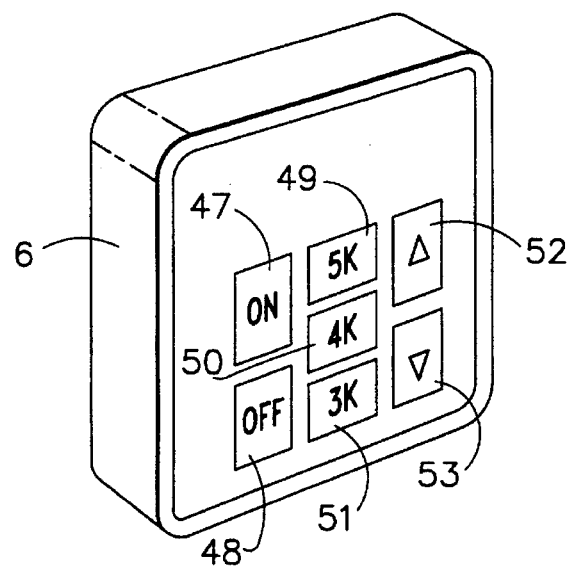
FIG. 6 is a perspective view of an exemplary control panel of the present invention.

An exemplary control panel 6 is illustrated in FIG. 6. It will be understood that any appropriate type of control panel can be used so long as it is capable of supplying the appropriate input signals to electronic control device/power supply 42. For purposes of an exemplary showing, the control panel 6 of FIG. 6 is shown as a very simple panel for control of lighting systems of the type illustrated in FIGS. 1–4. To this end, the panel 6 is provided with an on button 47 and an off button 48 for the main light source 32. It may also be provided with a series of buttons 49, 50 and 51, enabling the doctor to select a desired color temperature. Depending upon the sophistication of the filter system, additional light temperature buttons may be added. Finally, the control panel 6 is provided with a button 52 to increase the intensity of the light energy and a button 53 to decrease the intensity.

Where more than one lighthead is involved, and where each lighthead is provided with its own remote light source, a panel of the type shown in FIG. 6 may be provided for each lighthead. Alternatively, a single panel of the type shown in FIG. 6 may be provided, further including a selector switch. When the selector switch designates a particular one of the light sources, the remaining buttons 47 through 53 will control that light source, its color temperature and intensity.

The light piping member 4 of the embodiments thus far described may take any appropriate form. Examples of light piping material which can be used include polymeric fiber optic material, glass fiber optic material, liquid filled fiber optic material and hollow tubes with reflective interior surfaces. Bundled glass or acrylic-type strands with an outer cladding material have been successfully used. A preferred light piping material is a polymeric fiber optic material, and specifically a soft acrylic light piping material having a diameter of approximately ¾ inch and a Teflon® sheathing. The soft acrylic has an index of refraction of 1.5 and the Teflon® has an index of refraction of 1.2. The single strand acrylic light piping material is preferred over bundles of smaller glass or polymeric strands. The spaces between strands constitute losses, and it has been found that glass strands eventually break if manipulated.

Figure 7:
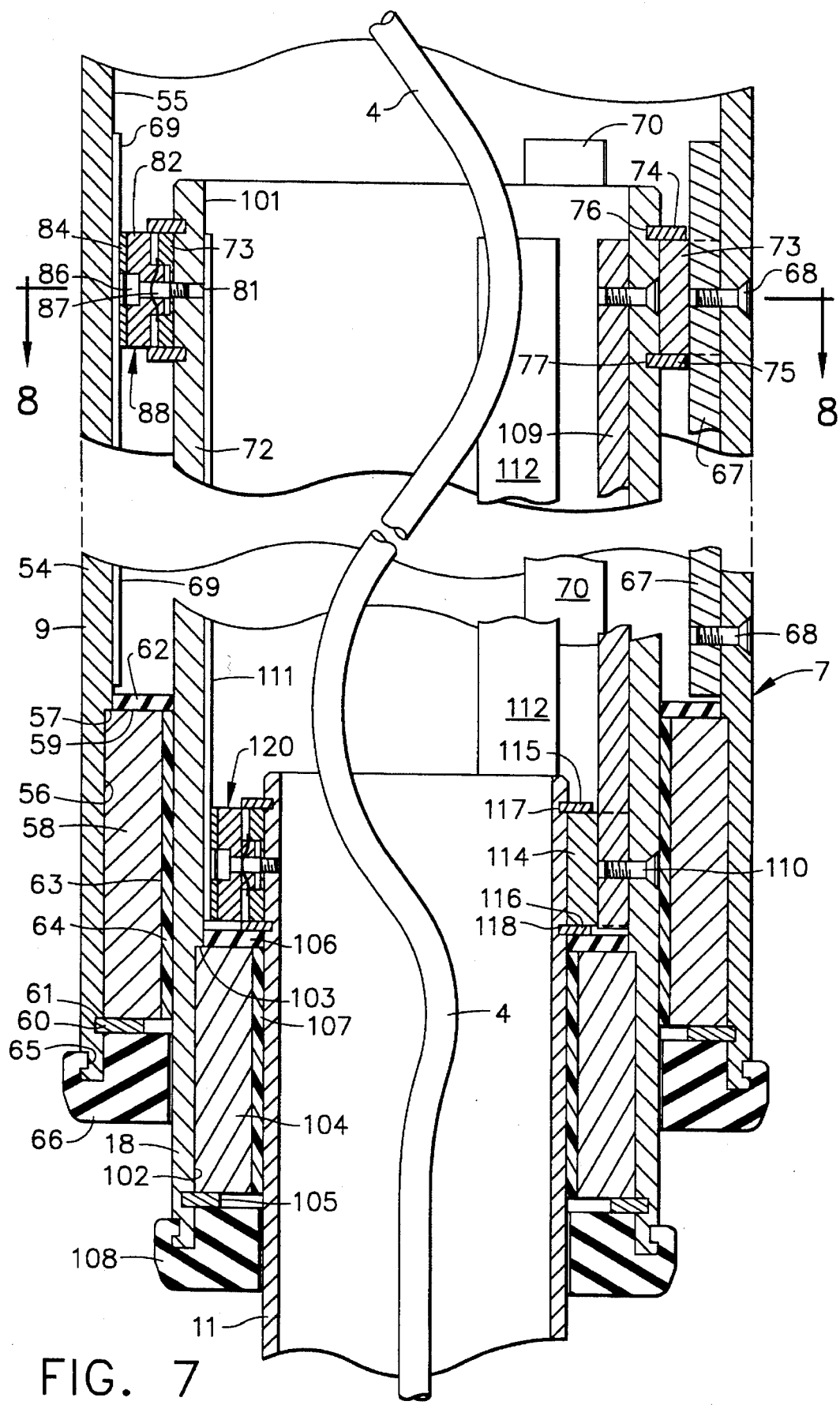
FIG. 7 is a fragmentary, cross sectional, elevational view of a telescoping portion of an exemplary suspension system of the present invention.
Figure 8:
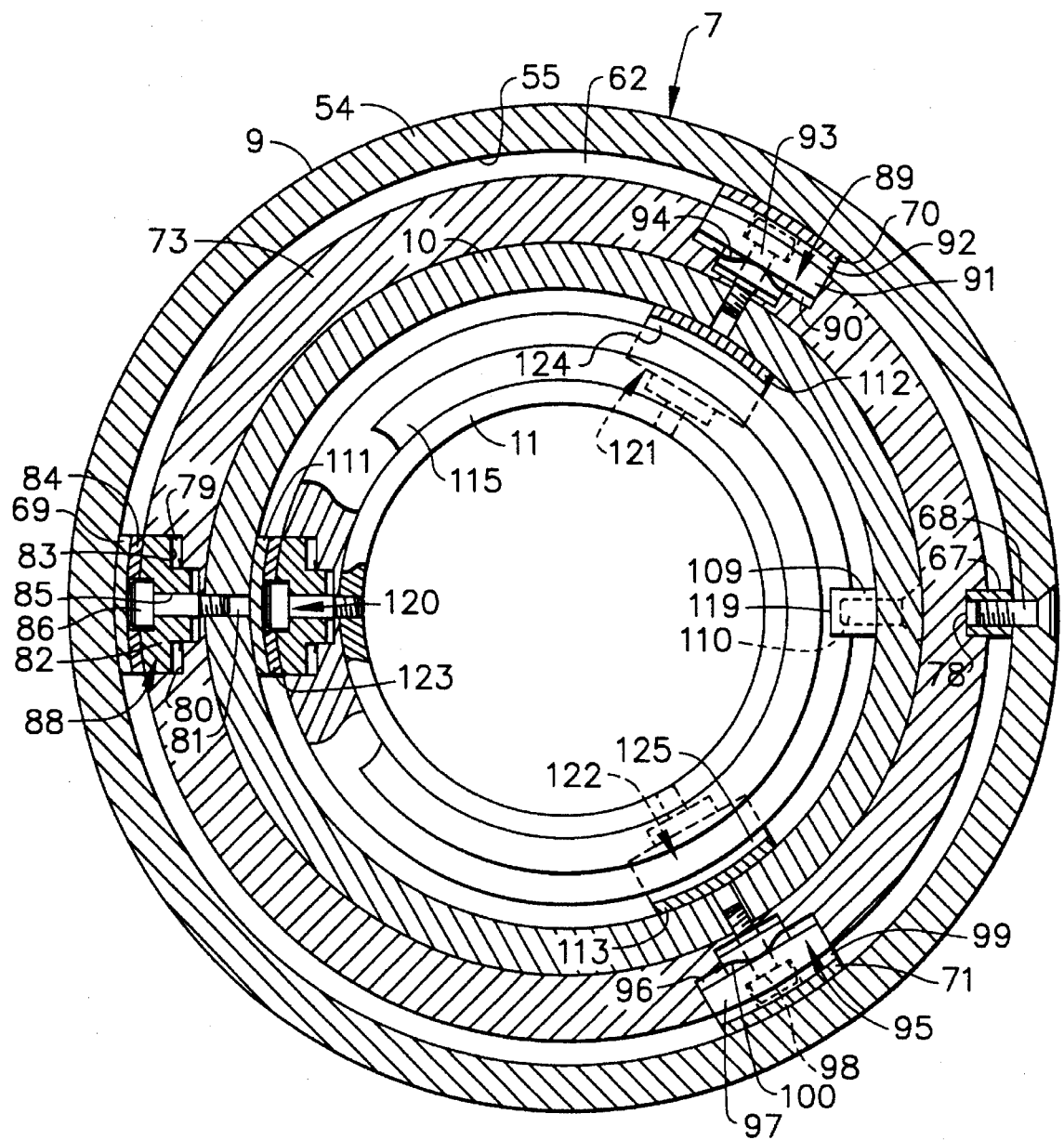
FIG. 8 is a transverse cross sectional view taken along section line 8—8 of FIG. 7.

FIGS. 7 and 8 illustrate an exemplary form of support assembly 7 which may be used in any of the embodiments described above. It will be apparent from FIGS. 7 and 8 that since the light source, its filter devices and the like have been removed from the lighthead, the lighthead can be greatly reduced in bulk and weight so that complex and ponderous counterbalancing systems are not required to support the lighthead. In FIGS. 7 and 8, the three telescoping members 9, 10 and 11 of the support assembly 7 are shown. The upper member 9 comprises an elongated cylindrical casing 54. Throughout the majority of its length, the casing 54 has a cylindrical internal surface 55 of uniform diameter. Near its bottom end, the casing 54 has an internal cylindrical surface 56 of slightly greater diameter, forming an annular shoulder 57 between internal surfaces 55 and 56 (see FIG. 7). An annular spacer 58 is located within the interior surface portion 56. The annular spacer 56 has an upper end 59 which abuts the shoulder 57 of casing 54. The annular spacer 58 is held in place by a split metal ring 60 mounted in annular notch 61 formed in the interior surface 56. The upper end 59 of spacer 58 is provided with an annular layer 62 of cushion material. The inside cylindrical surface 63 of spacer 58 is provided with a covering layer 64 of cushion material. The cushion material layers 62 and 64 may be made of rubber, soft plastic or the like. The layer 64 cooperates with the outside surface of support assembly intermediate member 10 to help maintain it properly vertically aligned. At the lowermost end of the casing 54 of upper member 9, there is an exterior annular groove 65 adapted to receive and retain a hook-like portion of an annular finishing rim 66 at the bottommost end of casing 54. Rim 66 may be made of resilient material such as rubber, or the like.

As is clearly shown in FIGS. 7 and 8, the inside surface of casing 54 of support assembly upper member 9 has affixed thereto a vertically extending rail 67 attached to the casing 54 by screws 68. The purpose of the rail 67 will be apparent hereinafter.

On the inside surface 55 of the casing 54, diametrically opposite rail 67, there is affixed a vertical magnetic strip 69. Additional identical magnetic strips 70 and 71 are so located on the surface 55 that the magnetic strips 69, 70 and 71 are equidistant with respect to each other.

The intermediate telescoping member 10 of support assembly 7 comprises a cylindrical casing 72 having an external diameter such as to be just nicely and slidably received within the annular layer 64 of cushion material affixed to the spacer 58 of casing 54. Near its upper end the casing 72 is provided with an annular surrounding ring 73 held in place above and below by a pair of spit metal rings 74 and 75 engaged in annular notches 76 and 77 formed in casing 72 (see FIG. 7). As is most clearly shown in FIG. 8, the ring 73 is provided with a vertical notch 78 adapted to just nicely and slidably receive rail 67. By virtue of the engagement of rail 67 in notch 78, relative rotation of the casing 54 of upper member 9 and the casing 72 of intermediate member 10, about their long axes is precluded.

Directly opposite the magnetic strip 69 on the inside surface 55 of the casing 54 of upper member 9, the ring 73 of the casing 72 of intermediate member 10 is provided with a stepped recess which goes all the way through ring 73 and is provided with an intermediate shoulder 80. The casing 72 of intermediate member 10 is provided with a threaded bore 81 which communicates with recess 79. Located within the recess 79 there is a plunger 82 of corresponding shape and having an intermediate shoulder 83 facing recess shoulder 80. On its outermost face, the plunger 82 carries a magnetic strip 84 adapted to cooperate with magnetic strip 69 which it abuts. The plunger 82 has a bore 85 formed therein, adapted to slidably receive a headed bolt 86. The headed bolt 86 is threadedly engaged in the threaded bore 81 of casing 72 and permits a limited radial shifting of the plunger 82 within the bore 79. The bolt 86, however, assures that the plunger 82 is captive within bore 79. The structure is completed by a spring member 87 (see FIG. 7) between the bore shoulder 80 and the plunger shoulder 83, constantly urging the magnetic strip 84 into contact with the magnetic strip 69. The overall assembly of the bore 79, the plunger 82, the retaining bolt 86, the magnetic strip 84 and the biasing spring 89 is generally indicated in FIGS. 7 and 8 at 88. The ring 73 affixed to the casing 72 of intermediate member 10 is provided with a similar assembly generally indicated at 89 and located opposite magnetic strip 70. The assembly 89 comprises a stepped bore 90, a plunger 91, a plunger mounted magnetic strip 92, a retaining bolt 93, and a biasing spring 94. The assembly is identical to assembly 88 previously described and maintains the magnetic strip 89 in abutting relationship with the magnetic strip 70. Similarly, the ring 73 mounted on the casing 72 of intermediate member 10 is provided with a third such assembly generally indicated at 95 and otherwise identical to assemblies 89 and 88. The assembly 95 comprises a bore 96, a plunger 97, a retaining bolt 98, a magnetic strip 99 and a biasing spring 100.

The casing 72 of the intermediate member 10 of the support assembly 7 has for the majority of its length an inside surface 101 of uniform diameter. Near its lowermost end, it has an inside surface 102 of slightly larger diameter forming an annular shoulder 103 therebetween. Mounted within the lowermost part of casing 72 and abutting the shoulder 103 there is an annular spacer 104 similar to annular spacer 58. The annular spacer 104 is held in place by a split metal ring 105 mounted in a notch 106 in casing 72. The annular spacer 104 is provided at its upper end with an annular cushion member 107, similar to cushion member 62 of annular spacer 56. The inside surface of annular spacer 104 is provided with an annular layer of cushion material 107, similar to the annular layer of cushion material 64. The lowermost edge of the casing 72 is provided with a resilient rubber finishing member 108, similar to the finishing member 66.

The inner surface 101 of the casing 72 of intermediate member 10 has a vertical rail 109 affixed thereto by bolts 110. The rail 109 is similar to the previously described rail 67. The inside surface 101 of the casing 72 of intermediate member 10 is also provided with three vertically oriented magnetic strips 111, 112, and 113. The strips 111, 112 and 113 are evenly spaced about the inner surface 101, and the magnetic strip 111 is diametrically opposite the rail 109.

The lower member 11 of the support assembly 7 is a cylindrical member having an outer diameter such that the lower member 11 is just nicely and slidably received within the cushion layer 107 of the spacer 104 of intermediate member 10. Near its upper end, the lower member 11 is provided with an annular ring 114 held in place by a pair of split metal rings 115 and 116 located in annular notches 117 and 118 in the lower member 11. It will be understood that the ring 114 is similar to the ring 73 of intermediate member 10 and the split metal rings 117 and 118 are similar to the split metal rings 76 and 77 of intermediate member 10. As is most clearly shown in FIG. 8, the ring 114 has a notch 119 formed therein adapted to receive rail 109 with a sliding fit. The rail 109 is similar to the rail 67 mounted on member 9 and precludes relative rotation of the intermediate member 10 and the lower member 11 about their axes. By virtue of the two rails 67 and 109, there is no relative axial rotation of the members 9, 10 and 11 with respect to each other. The ring 114 of the lower member 11 is provided with three evenly spaced stepped notches provided with plunger assemblies generally indicated 120, 121 and 122. The plunger assemblies 120, 121 and 122 are located opposite the magnetic strips 111, 112 and 113 on the inside surface 101 of intermediate member 10. The plunger assemblies 120, 121 and 122 are identical to plunger assemblies 88, 89 and 95, previously described. Finally, plunger assemblies 120, 121 and 122 carry magnetic strips 123, 124 and 125, respectively. The magnetic strips 123, 124 and 125 are maintained in contact with magnetic strips 111, 112 and 113, respectively by the spring bias plunger assemblies 120, 121 and 122.

From the above description, it will be apparent that the intermediate member 10 of support assembly 7 is vertically or axially shiftable within the uppermost member 9. The intermediate member will shift upwardly or downwardly whenever an upwardly or downwardly directed force is applied to the lighthead 2. The intermediate member 10 will remain at any desired position within the uppermost member 9 by virtue of the interaction of the magnetic strips 69, 70 and 71 on the inside surface 55 of the upper member 9 and the plunger mounted magnetic strips 84, 92 and 99. The uppermost position of the intermediate member 10 within the upper member 9 is determined by the abutment of the finishing ring 108 of the intermediate member against the finishing ring 66 of the upper member. The lowermost position of intermediate member 10 with respect to upper member 9 is determined by abutment of the split metal ring 75 of intermediate 10 against the annular ring of cushion material 62 of the upper member 9.

The operation of the lower member 11 within the intermediate member 10 is identical to that described with respect to the intermediate member 10 and the upper member 9. To this end, the magnetic strips 111, 112 and 113 mounted on the inner surface 101 of intermediate member 10 cooperate with the plunger biased magnetic strips 123, 124 and 125, respectively, to maintain the lower member 11 at any vertical position with respect to the intermediate member 10. The lower member 11 is shown in its lowermost position with respect to the intermediate member 10 in FIG. 7, with the split metal ring 118 of the lower member 11 abutting the annular cushion member 106 of intermediate member 10. The uppermost position of the lower member 11 with respect to the intermediate member 10 may be determined by abutment of the finishing rim 108 of intermediate member 11 by a rim means (not shown) located near the lowermost end of lower member 11.

As will be more fully explained hereinafter, the support assembly 7 of FIGS. 7 and 8 will be rotatably mounted at its uppermost end, so as to be capable of rotating about its vertical axis. The support assembly 7 will hold the lighthead 2 at any desired vertical position without the requirement of large and bulky counterbalance devices and the like. This is true because the weight and the bulk of the lighthead 2 are far less than that of prior art lightheads, as will next be apparent.

Figure 9:
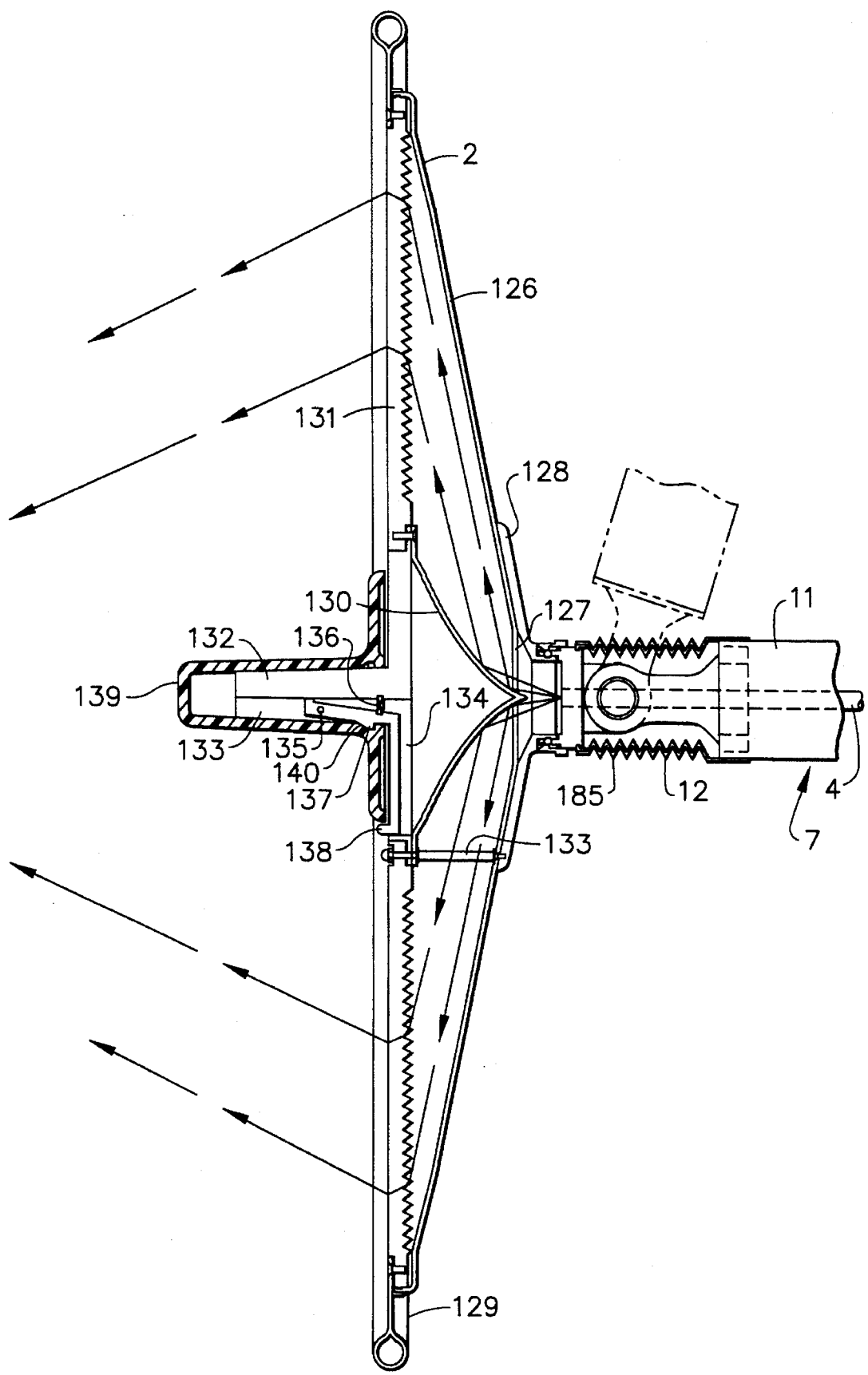
FIG. 9 is a fragmentary cross sectional view of an exemplary lighthead for use with the present invention.

An exemplary, but non-limiting, lighthead 2 is illustrated in FIG. 9. In this particular embodiment, the lighthead 2 comprises a dish-like cover 126. The cover 126 has a central opening 127 about which is mounted a fitting 128. The fitting 128, to be described hereinafter, enables the lighthead 2 to be attached to the joint 12. About its perimeter, the cover 126 is provided with a rim 129. The rim 129 can serve as a non-sterile gripping surface for circulating nurses to maneuver the lighthead.

In the particular embodiment illustrated, the lighthead has a central substantially conical reflector 130 surrounded by refractor means 131 which extend from reflector 130 to the rim 129.

Lighthead 2 is provided with a central handle 132 which is affixed by plurality of bolt and spacer means (one of which is shown at 133) to the reflector 126 and fitting 128. The handle 132 has a transverse slot 133 formed therein to accommodate a latch member 134. The latch member 134 is pivoted within the slot as at 135 and is biased to its latching position (shown in FIG. 9) by compression spring 136. The latch 134 is provided with a latching tine 137. It is also provided with a release handle 138 by which it may be pivoted in a counterclockwise direction (as viewed in FIG. 9) to a release position.

The handle 132 is provided with a surrounding handle cover 139. The handle cover 139 has an annular notch 140 on its inside surface adapted to be engaged by the latching tine 137 of latch 134. In this way, the handle cover 139 is maintained in position on the handle 132. Release of latch 134 will release handle cover 139. The handle cover 139 constitutes a sterilizable member covering the handle 132 and enabling manipulation of the handle by the doctor to position the lighthead. The handle cover 139 may be resterilizable and reusable, or it may constitute a disposable item, all as is well known in the art. The majority of the lighthead may be made of plastic or other lightweight material. Lenses (if present), reflectors, and refractors can be molded plastic precision components.

The lighthead will utilize the end of the light piping member 4 as its light source. The lighthead 2 will take the light energy from the end of the light piping member 4, collect it, control it, and deliver it to the surgical site in a prescribed pattern size and with prescribed optical parameters. The lighthead will be designed to create a light pattern which is acceptable and usable by the surgical team. Typically, a lighthead light pattern is focused at a distance of about 40 inches from the face of the lighthead. The pattern diameter of light at the focus is usually from about 6 inches to about 8 inches in diameter, with a depth of field of usable light energy of about 30 inches.

Figure 10:
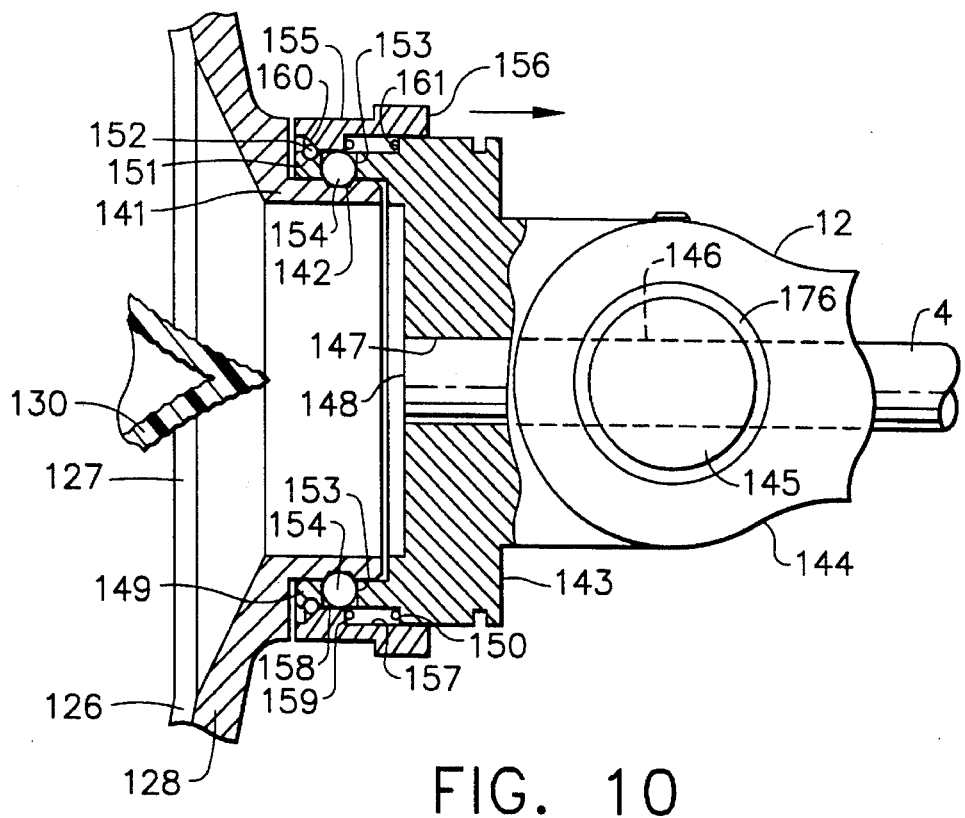
FIG. 10 is a fragmentary view, partly in cross section, illustrating the quick-connect joint between the lighthead and the suspension system, the joint being in connected condition.
Figure 11:
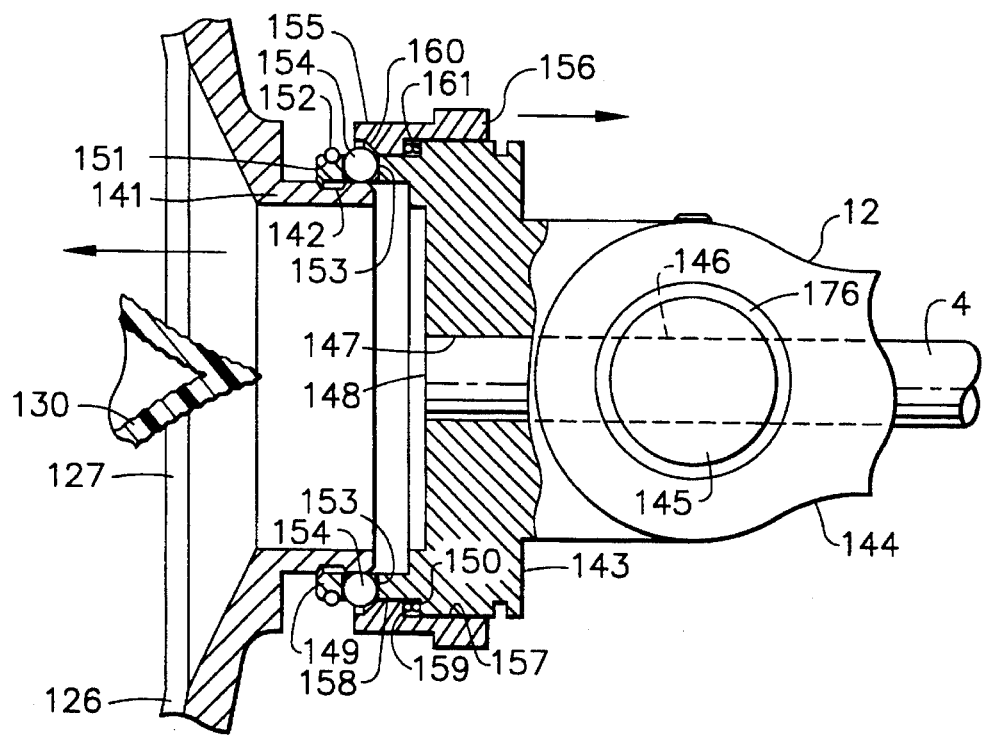
FIG. 11 is a fragmentary view, partly in cross section, similar to FIG. 10, but illustrating the quick-connect joint in released condition.

Since the lighthead 2 is compact, lightweight, relatively inexpensive to manufacture, and does not contain the light source, it is possible to make the lighthead easily removable from and attachable to the joint 12, so that lightheads of various sizes can be provided for each lighting system. For example, a series of lightheads ranging in diameter from about 18 inches to about 28 inches could be used for various surgical applications. The lightheads are designed to be easily interchanged, allowing the lightheads to be quickly changed for various surgical procedures, or for doctors' preference. For example, for deep cavity work such a neurosurgery, a small 20 inch lighthead with spotlight quality of light (i.e. a small pattern 4 inches to 5 inches in diameter and a tight and long depth of field) may be utilized. For an operation such as a heart bypass with a team of three surgeons, a large 28 inch diameter lighthead may be used to provide a large pattern of from about 6 inches to about 8 inches in diameter, with much better shadow reduction performance. FIGS. 10 and 11 illustrate an exemplary quick-connect and disconnect coupling between the lighthead 2 and the joint 12.

Reference is first made to FIG. 10. It will be noted that the fitting 128 affixed to the cover 126 of the lighthead 2 (see also FIG. 9) terminates in a cylindrical collar 141. The cylindrical collar 141 has an annular groove 142 formed therein.

The joint 12 comprises a coupling element 143 affixable to the lighthead 2, and a bifurcated element 144 affixed to the lower member 11 of the support assembly 7. The coupling element 143 and the bifurcated element 144 are pivotally joined together by a pivot pin 145, as will be described more fully hereinafter. The light piping member 4 extends through a perforation 146 in pivot pin 145 and a perforation 147 in the coupling element 143. The light piping member 4 terminates in an end 148 at the end of perforation 147.

The coupling element 143 has an annular skiff 149 having an inside diameter such as to just nicely receive the annular collar 141 of lighthead fitting 128. The skiff 149 has an exterior diameter slightly less than that of the main body portion of coupling element 143, forming an annular shoulder 150 therebetween. Near its free end, the annular skirt 149 has a peripheral groove 151 in which a split metal stop ring 152 is mounted.

The annular skiff 149 has a series transverse perforations formed therein. Two such perforations are illustrated in FIG. 10 at 153. The perforations 153 are each adapted to contain a ball 154. Each transverse skirt perforation is of such diameter as to just nicely receive its respective ball 154. The ball 154 may be inserted into the perforation from the exterior of skirt 149. The openings formed by the perforations 153 at the inside surface of skiff 149 are slightly restricted so that only a portion of the balls 154 within perforations 153 can extend therethrough.

The quick connect and disconnect coupling between the lighthead 2 and the joint 12 is completed by the provision of a release ring 155 mounted on the exterior of coupling element 143. The release ring 155 may be provided with an exterior rim 156 to facilitate manual axial shifting of the ring between locking and release positions. Release ring 155 has a first inner annular surface 157 having a diameter approximating the outside diameter of the main body portion of coupling element 43. Release ring 155 has a second interior surface 158 having a diameter approximating the exterior diameter of skiff 149. An annular shoulder 159 is defined between interior surfaces 157 and 158 and faces the shoulder 150 of coupling element 143. The inside surface of release ring 155 is completed by an outwardly tapered portion 160, the purpose of which will be apparent hereinafter. Release ring 155 is constantly urged to its latching position shown in FIG. 10 by a compression spring 161, one end of which abuts the release ring shoulder 159 and the end of which abuts the shoulder 150 of coupling element 143.

In FIG. 10, the lighthead 2 and the joint 12 are shown coupled and locked together. Just enough of the balls 154 are able to extend through the opening formed by perforation 153 on the inside surface of skirt 149 to enter the annular groove 142 of the lighthead collar, latching the lighthead 2 to the joint 12. The balls 154 are held in this locking position by the inside surface portion 158 of release ring 155.

If release ring 155 is shifted to its release position, as shown in FIG. 11, the outwardly tapered surface 160 of the release ring will enable the balls 154 to shift outwardly within skirt perforations 153, disengaging the annular groove 142 of the lighthead collar 141. As a consequence, the lighthead can be released from the coupling element 143 and another lighthead having a similar collar can be substituted. When the lighthead collar 141 is removed from the coupling element 143, the balls 154 are still captive. As indicated above, they cannot pass through the slightly restricted openings formed by the perforations 153 on the inside surface of skirt 149. Similarly, they cannot pass through the opposite ends of perforations 153 by virtue of the outwardly tapered surface 160 of release ring 155. The release ring 155 is captive on coupling element 143 by virtue of split metal ring 152. The ring 152 also determines the latching position of release ring 155. When the release ring is allowed to return to its locking position under the influence of compression spring 161, the tapered surface 160 will urge the balls 154 to their locking positions.

The joint 12, located between the lighthead 2 and the lowermost member 11 of support assembly 7, can take any form. It should be such as to permit rotation of the lighthead about a horizontal axis with the capability of maintaining the lighthead in the desired adjusted position. An exemplary joint 12 for this purpose is illustrated in FIGS. 12–15.

Figure 14:
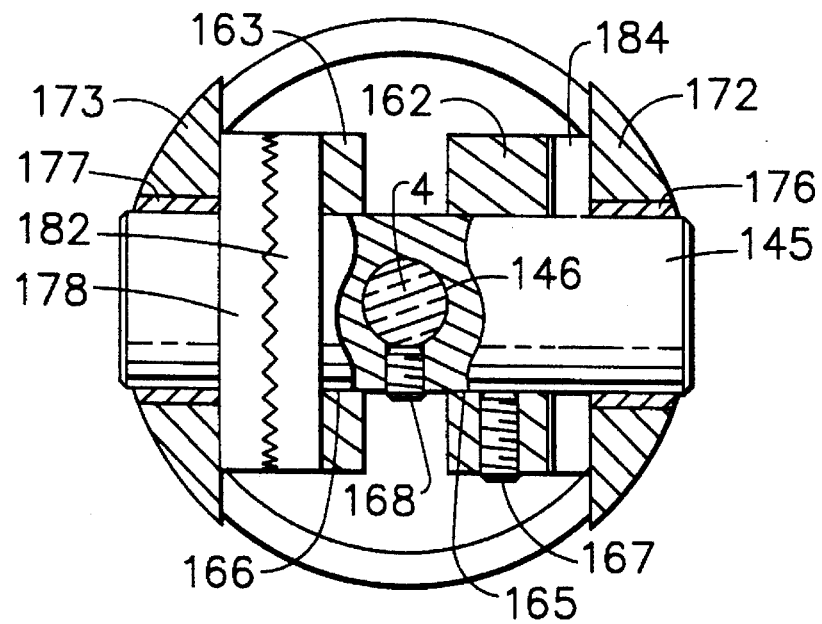
FIG. 14 is a transverse cross sectional view taken along section line 14—14 of FIG. 13.

As indicated with respect to FIGS. 10 and 11, the joint 12 comprises the coupling element 143 and a bifurcated element 144. In FIGS. 12, 13 and 14, the coupling element 143 is shown with release ring 155 mounted thereon. The coupling element 143, as viewed in FIGS. 12–14, has a pair of upstanding members 162 and 163. The members 162 and 163 are spaced from each other by distance approximating the diameter of light piping member 4. At the base of member 162 and 163, the coupling element 143 has the perforation 147 through which the light piping member 4 extends, as shown. It will be noted from FIGS. 13 and 14 that the upstanding member 162 is wider than the upstanding member 163. The reason for this will be evident hereinafter. The upstanding members 162 and 163 are provided with coaxial transverse bores 165 and 166 through which pivot pin 145 extends. Pivot pin 145 is non-rotatable with respect to coupling element 143 by virtue of set screw 167. As described with respect to FIG. 10, the light piping member 4 passes through perforation 146 in pivot pin 145 and is held therein by set screw 168.

The bifurcated member 144 comprises an annular body 169 having a large central opening 170 through the light piping member 4 passes. The annular body portion 169 is provided with a peripheral notch 171 sized to just nicely receive the lowermost end of lower member 11 of support assembly 7. The body portion 169 may be attached to the lowermost end of lower member 11 in any appropriate way including fastening means (not shown) such a machine screws or the like. From the body portion 169, there extends a pair of birfucations 172 and 173. Near their free ends, the birfucations 172 and 173 are provided with coaxial perforations 174 and 175 respectively. The perforation 174 has a bushing 176 mounted therein, and the perforation 175 has a bushing 177 mounted therein. The ends of pivot pin 145 are rotatively mounted in bushings 176 and 177.

Figure 15:
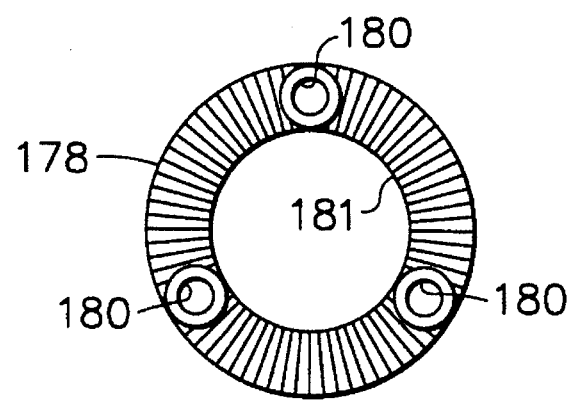
FIG. 15 is an elevational view of one of the toothed position holding plates of FIGS. 13 and 14.

The bifurcation 173 of bifurcated element 144 has a toothed gear 178 affixed thereto by machine screws, one of which is shown at 179 in FIG. 13. The toothed gear 178 is illustrated in FIG. 15. It is provided with a series of perforations 180 adapted to accommodate the machine screws 179. It is also provided with a central perforation 181 through which the pivot pin 145 passes with clearance.

As is evident from FIGS. 13 and 14, the upstanding member 163 has an identical gear 182 affixed thereto by machine screws, one of which is shown at 183 in FIG. 13.

It will be noted from FIGS. 13 and 14 that when the gears 178 and 182 are meshed, the upstanding member 162 of coupling element 143 is spaced from bifurcation 172. In fact, the gears 178 and 182 are urged to a meshed condition by a spring member 184 through which the pivot pin 145 passes and which is located between and in abutment with the facing surfaces of upstanding member 162 and bifurcation 172.

If the lighthead 2 is grasped by sterile handle 139 or non-sterile rim 129, and manipulated to cause the lighthead 2 and coupling element 143 to rotate with respect to the bifurcated element 144 about the axis of pivot pin 145, the teeth of gears 178 and 182 are such that the rotative force will cause the gears 178 and 182 to separate, the bifurcated element 144 shifting to the left (as viewed in FIGS. 13 and 14) with respect to the coupling element 143 and against the action of spring 184. The gear 182 will rotate with respect to gear 178 until the desired angular position of the lighthead 2 about pivot pin 145 has been reached. When the rotative force is discontinued, the spring 184 will cause the gears 178 and 182 to mesh again, maintaining the lighthead in its desired angular position. This kind of locking joint 12 is made possible and practical by the fact that the lighthead is so lightweight. The joint 12 of FIGS. 12–14 may be provided with an accordion pleated tubular cover 185, if desired. Such a cover is shown, for example, in FIG. 9 at 185.

Figure 16:
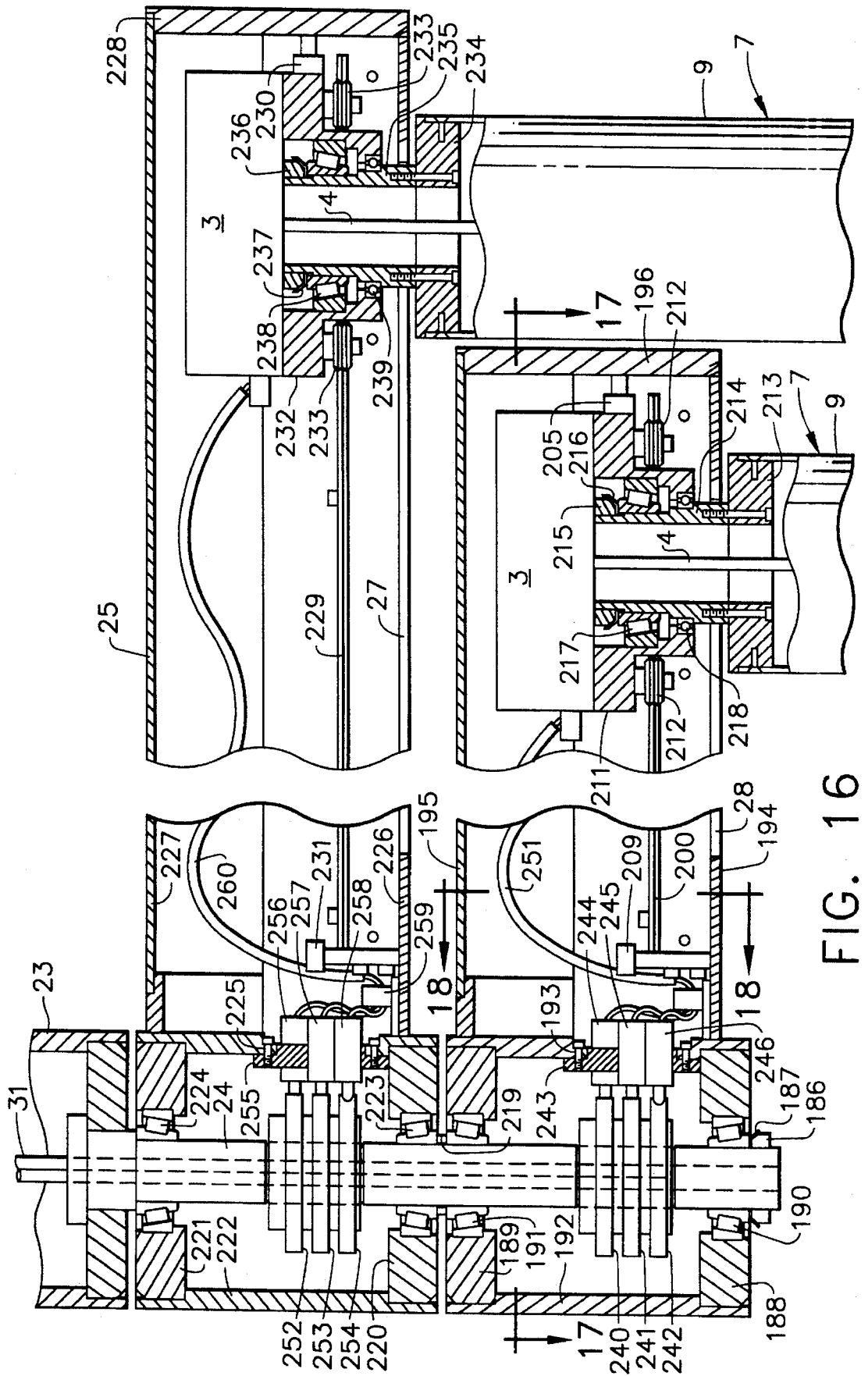
FIG. 16 is a fragmentary cross sectional view of the suspension system of FIG. 5.
Figure 17:
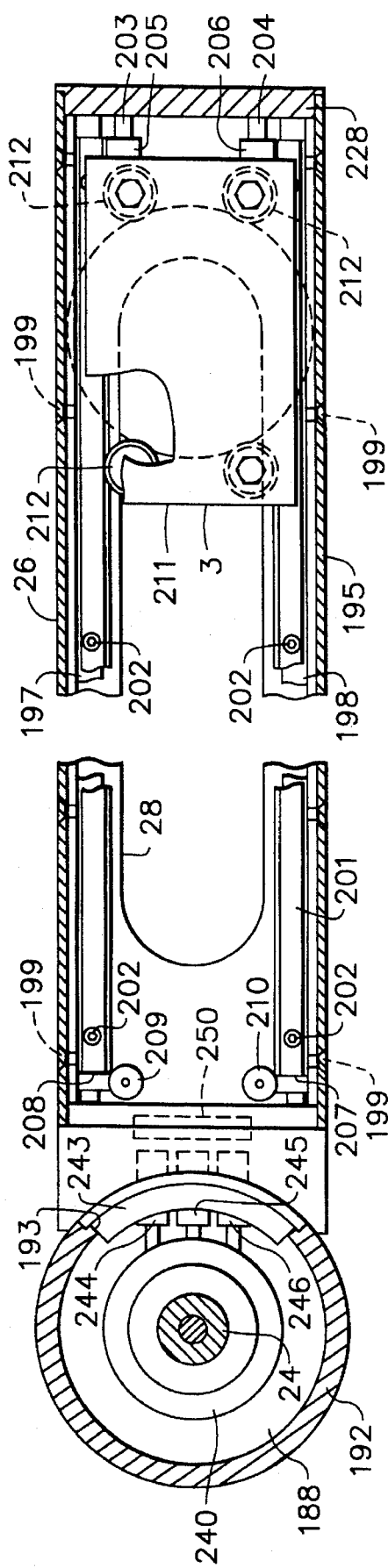
FIG. 17 is a cross sectional view taken along section line 17—17 of FIG. 16.
Figure 18:
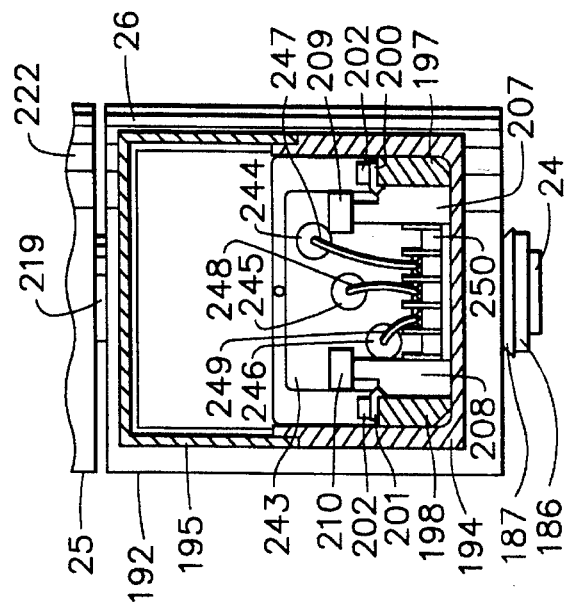
FIG. 18 is a fragmentary cross sectional view taken along section 18—18 of FIG. 16.

Reference is now made to FIGS. 16, 17 and 18, wherein the exemplary multiple suspension system of FIG. 5 is illustrated in greater detail. Turning first to FIG. 16, the ceiling mount 23 non-rotatively supports the downwardly depending shaft 24. As shown in FIG. 5, the arms 25 and 26 are rotatively mounted on shaft 24, and each carries its own downwardly depending support system 7.

At its lowermost end, the shaft 24 is provided with a nut 186 and a lock washer 187. As is most clearly shown in FIGS. 16 and 17, that end of arm 26 which is pivotally attached to the shaft 24 comprises a pair of circular plates 188 and 189 provided with roller bearings 190 and 191, respectively, about shaft 24. The lower roller bearing set is supported by nut 186 and lock washer 187. The rotatively mounted end of arm 26 has a cylindrical body 192 appropriately affixed to the circular plates 188 and 189. The cylindrical body 192 has an opening 193 therein, the purpose of which will be apparent hereinafter.

The elongated arm 26 is of rectangular cross section and extends laterally of the cylindrical body 192 about the opening 193 therein. The arm 26 comprises a lower U-shaped member 194, the base of which constitutes the bottom of arm 26 and the upstanding legs of which comprise part of the sidewalls of arm 26. The arm 26 further comprises an elongated upper member 195 of inverted U-shaped cross section, the base of which forms the top of arm 26 and the downwardly depending legs of which form the remainder of the sides of arm 26. The elongated arm 26 is closed at its outermost end by an end plate 196. It will be noted from FIGS. 16 and 17 that the base portion of the lower member 194, constituting the bottom of the arm 26, has the elongated slot 28 formed therein.

As is most clearly shown in FIGS. 17 and 18, a pair of bars 197 and 198 are affixed to the upstanding sides of member 194 by a series of machine screws 199. The bars 197 and 198 have rails 200 and 201 affixed to their upper surfaces by bolts 202. It will be noted that the innermost edges of the rails 200 and 201 are outwardly V-shaped. Adjacent the outermost ends of rails 200 and 201 there is provided on end plate 196 a pair of supports 203 and 204. The supports 203 and 204 mount a pair of resilient bumpers 205 and 206, respectively. Adjacent the other ends of rails 200 and 201 there is a pair of upstanding supports 207 and 208 mounting a pair of resilient bumpers 209 and 210, respectively.

The bumpers 205, 206, 209 and 210 are adapted to cooperate with a carriage 211. The carriage 211 is provided with wheels 212. The wheels 212 have inwardly directed V-shaped peripheral edges which engage the rails 200 and 201. The resilient bumpers 205,206, 209 and 210 determine the outermost and innermost positions of carriage 211.

As is most clearly shown in FIG. 16, the carriage 211 supports the light source module 3. The carriage 211 also supports its respective one of the support assemblies 7. For this purpose, the uppermost end of member 9 of the support assembly 7 terminates in an annular plate 213 to which is bolted a hollow cylindrical fitting 214 having a stepped exterior surface. At its uppermost end, the fitting 214 has a nut 215 threadedly engaged thereon and provided with a lock washer 216. The nut and lock washer rest upon a roller bearing assembly 217 mounted between carriage 211 and fitting 214. Finally, there is a roller bearing located between the carriage 211 and the fitting 214. The fitting 214 extends through the elongated slot 28 in the bottom surface of arm 26. It will be apparent from the description just given that the fitting 213 suspends the support assembly 7 from carriage 211 and that the support assembly 7 is rotatable about its vertical axis with respect to carriage 7. The light piping member 4 passes through the fitting 214 and into the light source module. The light piping member 4 may be rotatable with the support assembly 7.

Comparing FIGS. 5 and 16, it will be apparent that the carriage 211 enables the support assembly 7 and lighthead 2 of arm 26 to shift longitudinally of the arm. At the same time, the support assembly 7 is rotatable about its vertical axis. In addition, the lighthead 2 is rotatable about the horizontal axis of joint 12. Finally, the entire combination of arm 26, support assembly 7 and lighthead 2 is rotatable about the central vertical shaft 24. Added to this is the fact that the vertical height of the lamp may be adjusted by virtue of the telescoping members 9, 10 and 11 of the support assembly 7. It will thus be noted that the lighthead 2 can be located in a myriad of positions with respect to both location and angularity. This adjustment of the lighthead can be made very quickly and very easily and the lighthead will remain in any desired position without drift.

The arm 25 and its appurtenances are substantially identical to the arm 26, with the exception that the arm 25 is longer, as shown, so that its support assembly 7 can be so located as to provide clearance for the rotation of arm 26.

On the shaft 24, a spacer 219 is located above the roller bearing 191 of arm 26. That end of arm 25, pivoted to shaft 24, is provided with a pair of annular plates 220 and 221 located at the top and bottom of a cylindrical body 222 and each provided with a roller bearing assembly 223 and 224. The lower roller bearing assembly 223 rests upon spacer 219. The cylindrical body 222 of arm 25 has an opening 225 similar to the opening 193 of cylindrical body 192. The purpose of opening 225 will be apparent hereinafter. The main body of the arm 25 extends laterally of the cylindrical body 222 and about the opening 225 therein. The main body part of arm 25 is made up of a lower member 226 of U-shaped cross section and an upper member 227 of inverted U-shaped cross section. At its outermost end, the arm 25 is provided with a closure plate 228. It will be understood that the U-shaped members 226 and 227 and the end plate 228 are substantially identical to the U-shaped members 194 and 195 and end plate 96, with the exception that the U-shaped members 226 and 227 of arm 25 are longer than the U-shaped members 194 and 195 of arm 26.

The arm 25 has a pair of rails, similar to rails 200 and 201 of arm 26. One such rail is shown at 229. The arm 25 is provided with bumpers equivalent to the bumpers 205,206, 209 and 210 of arm 26. Two of these bumpers are shown in FIG. 16 at 230 and 231.

The rails of arm 25 (one of which is shown at 229) support a carriage 232 provided with wheels 233. Carriage 232 supports the light source module 3 of arm 25. It also carries the support assembly 7 of arm 25. The manner in which the support assembly 7 is attached to carriage 232 is identical to that described with respect to carriage 211. Thus, the upper member 9 of support assembly 7 terminates in an annular plate 234 similar to plate 213 of arm 26. The plate 234 is provided with a stepped cylindrical fitting 235 identical to fitting 214 of arm 26. The fitting 235 is provided with a nut 236, a lock washer 237, a roller bearing 238 and a ball bearing 239 similar to the nut 215, lock washer 216, roller bearing assembly 217 and ball bearing assembly 218 of arm 26. It will be understood that the lighthead 2 carried by the support assembly 7 of arm 25 will be maneuverable in exactly the same ways described with respect to the lighthead 2 of arm 26 and will remain in any selected position without drift.

A power supply cable 31 (see FIGS. 5 and 16) is made up of three wires (hot, neutral and ground) for the light source module 3 of each of the arms 25 and 26. Three of the six wires of power supply cable 31 for the light source module 3 of arm 26 are each attached to one of the ring commutators 240, 241 and 242. The ring commutators 240–242 may comprise hard molded phenolic members each having a brass outer ring for electrical conductivity. The commutators 240, 241 and 242 are non-rotatively attached to shaft 24. At the opening 193 in the cylindrical body 192 there is mounted an upstanding bracket 243. The bracket 243 supports three brush contacts 244, 245 and 246, cooperating with the commutators 240, 241 and 242, respectively. Wires 247, 248 and 249 from brush contacts 244, 245 and 246, respectively, are attached to terminal strip 250 (see FIG. 18). From the terminal strip 250, a three wire cable extends, having each of its three wires connected to one of the three wires 247, 248 and 249, respectively. The cable 251, in turn, is appropriately connected to the light source module 3. Means (not shown) may be provided to appropriately guide cable 251 during movement of the light source module 3 and carriage 211.

Power to the light source module 3 of arm 25 is provided in the same manner described with respect to arm 26. Thus, the arm 25 is provided with three commutators 252, 253 and 254 attached to the shaft 24. The remaining three wires of power supply cable 31 are each attached to one of the commutators 252–254. The arm 25 is provided with a bracket 255 substantially identical to the bracket 243 of arm 26 and supporting three brush contacts (i.e. one for each commutator) 256, 257 and 258. The brush contacts 256 through 258 are connected via terminal strip 259 to a three wire cable 260, similar to three wire cable 251 of arm 26.

It will be apparent from the above description of the structure of FIG. 16 that the arms 25 and 26 may be relatively lightweight and that electrical power may be delivered to the light source module 3 of each arm, regardless of the rotative positions of the arms.

Modifications may be made in the invention without departing from the spirit of it.

What is claimed:

1. A lighting assembly for directing a high illumination level light output onto at least one specifically defined task area or site to be illuminated, said lighting assembly comprising at least one lighting system, said at least one lighting system comprising a lighthead, together with a light source module, and an elongated light piping member therefor, said light piping member comprising an elongated sheath containing a single light transmitting strand or a bundle of light transmitting strands of lesser diameter, said light piping member having first and second ends, said light source module and said lighthead being interconnected by said light piping member, said light source module having a light source and means for focusing light from said light source onto said first end of said light piping member, and means in said lighthead to collect, control and direct light from said second end of said light piping member onto said site, a ceiling mounted support assembly for supporting and maintaining said lighthead in a plurality of adjusted positions and at a plurality of adjusted angularities, said light source and said light piping member of said at least one lighting system being fully contained within said support assembly, said light source module of said at least one lighting system being remote from said lighthead thereof, said lighthead and said support assembly being provided with a quick connect and disconnect coupling whereby said lighthead can be easily connected to and released from said support assembly, said second end of said light piping member being located in said support assembly adjacent said quick connect and disconnect coupling.

2. The lighting system claimed in claim 1 wherein filter means are located within said light source module to reduce or eliminate selected wavelengths of said light from said light source.

3. The lighting system claimed in claim 1 wherein filter means are located within said light source module to adjust the color temperature of said light from said light source.

4. The lighting system claimed in claim 1 wherein said light source in said light source module comprises a point source chosen from the class consisting of an incandescent lamp and a high intensity discharge arc lamp.

5. The lighting system claimed in claim 1 wherein said light source of said light source module comprises a metal halide arc lamp.

6. The lighting system claimed in claim 1 wherein said light source comprises a main light source, a similar back-up light source being so located within said light source module as to have the same performance characteristics as said main light source.

7. The lighting system claimed in claim 1 including a power supply for said light source and electronic means for turning said light source on and off and for increasing and decreasing the intensity of said light from said light source.

8. The lighting system claimed in claim 1 wherein said elongated light piping member is chosen from the class consisting of polymeric fiber optic material, glass fiber optic material, liquid filled fiber optic material and hollow tubing with reflective interior surfaces.

9. The lighting system claimed in claim 1 wherein said illumination level is at least 1000 lumens.

10. The lighting system claimed in claim 1 wherein said lighthead has a weight of up to about 10 pounds.

11. The lighting system claimed in claim 1 wherein said lighthead has a weight of up to about 5 pounds.

12. The lighting system claimed in claim 1 wherein said lighthead has a thickness of up to about 2 inches.

13. The lighting system claimed in claim 2 wherein said filter means comprises ultraviolet and infrared filter means, whereby thermal heat in said light output from said lighthead is minimized.

14. The lighting system claimed in claim 3 wherein said filter means comprises a wheel supporting a plurality of filters each providing a different color temperature of said light from said light source, and an electric indexing motor for rotating said wheel and selectively locating a desired one of said color temperature filters in the path of said light from said light source.

15. The lighting system claimed in claim 6 including a power supply for said light source and electronic control means for turning said light source on and off and for increasing and decreasing the intensity of said light from said light source.

16. The lighting system claimed in claim 7 including a filter means comprising a wheel supporting a plurality of filters each providing a different color temperature of said light from said light source, an electric indexing motor for rotating said wheel and selectively locating a desired one of said color temperature filters in the path of said light from said light source, said electronic control means actuating said motor.

17. The lighting system claimed in claim 7 including a control panel connected to said electronic control means, means on said panel for signaling said electronic control means to turn said light source on and off, and means on said control panel to signal said control means to increase and decrease the intensity of said light from said light source.

18. The lighting system claimed in claim 1 including a plurality of lightheads of different sizes and different light directing characteristics, said lightheads and said support means being provided with quick connect and disconnect couplings whereby each of said lightheads can be easily connected to and released from said support means.

19. The lighting system claimed in claim 1 wherein said lighting system comprises a medical lighting system comprises a medical lighting system for use in examination procedures, surgical procedures, and dental procedures.

20. The lighting system claimed in claim 1 wherein said lighting system comprises a surgical lighting system for use in an operating room.

21. The lighting system claimed in claim 1 including a ceiling, said lighthead support means comprising a ceiling mount affixed to said ceiling, a vertical shaft non-rotatively supported by said ceiling mount and depending downwardly therefrom, a horizontal hollow arm area affixed to said shaft for rotation thereabout, a pair of rails extending longitudinally within said arm, a wheeled carriage mounted on said rails for movement therealong, said light source module being mounted on said carriage, said arm having a bottom surface with an elongated longitudinal slot formed therein, a vertical support assembly rotatably affixed to said carriage and depending downwardly there from through said slot in said horizontal arm, said vertical support assembly terminating in a joint assembly, said joint assembly comprising first and second joint members, a pivot pin pivotally joining said first and second joint members together, means for releasably locking said second joint member in a plurality of angular positions with respect to said first joint member, said first joint member being affixed to said vertical support assembly, said lighthead being affixed to said second joint member, said light piping member being rotatable with respect to said light source and extending through said vertical support assembly and said joint assembly to said lighthead.

22. The lighting system claimed in claim 21 including a plurality of lightheads of different sizes and different light directing characteristics, quick connect and disconnect couplings on said lightheads and said second joint member, whereby each of said lightheads can be easily connected to and released from said second joint member.

23. The lighting system claimed in claim 21 wherein said vertical support assembly comprises an upper member, an intermediate member telescopically receivable in said upper member, and a lower member telescopically receivable within said intermediate member, said upper, intermediate and lower members being axially rotatable as a unit with respect to said ceiling mount, means to prevent rotation of said upper, intermediate and lower members with respect to each other, said upper member having longitudinal magnetic strips mounted on its inner surface and evenly spaced thereabout, said intermediate member having magnetic means affixed to its outer surface equal in number to and spring biased into abutment with said upper member strips, said intermediate member having longitudinal magnetic strips mounted on its inner surface and evenly spaced thereabout, said lower member having magnetic means affixed to its outer surface equal in number to and spring biased into abutment with said intermediate member strips, said intermediate member being axially shiftably between a retracted position and an extended position with respect to said upper member, and said lower member being shiftable axially between a retracted position and an extended position with respect to said intermediate member, said magnetic strips and abuting magnetic means holding said intermediate and lower members in desired axial positions, said first joint member being affixed to said lower member of said vertical support assembly.

24. The lighting system claimed in claim 23 including a plurality of lightheads of different sizes and different light directing characteristics, quick connect and disconnect couplings on said lightheads and on said second joint member, whereby each of said lightheads can be easily connected to and released from said second joint member.

25. The lighting system claimed in claim 1 including at least two lightheads.

26. The lighting system claimed in claim 25 including a light source module and an elongated light piping member for each lighthead.

27. The lighting system claimed in claim 25 wherein said elongated light piping member has a first end and is branched to provide a second end for each lighthead, said light source module being connected to both lightheads by said elongated light piping member.

28. A lighting assembly for directing a high illumination level light outputs onto at least one specifically defined task area or site to be illuminated, said lighting assembly comprising first and second light systems, said first light system comprising a first lighthead, together with a first light source module remote from said first lighthead, and a first elongated light piping member, said first light piping member comprising an elongated sheath containing a single large diameter light transmitting strand or a bundle of light transmitting strands of lesser diameter, said first light piping member having first and second ends, said first light source module and said first lighthead being interconnected by said first light piping member, said first light source module having a light source and means for focusing light from said source onto said first end of said first light piping member, and means in said first lighthead to collect, control and direct light from said second end of said first light piping member onto said at least one site, a second substantially identical lighting system comprising a second lighthead, a second light source module remote from said second lighthead and a second elongated light piping member, a ceiling, a ceiling mounted support means maintaining said first and second lightheads in a plurality of adjusted positions and at a plurality of adjusted angularities, said first and second light source modules and said first and second light piping members being contained within said support means, said support means comprising a ceiling mount affixed to said ceiling, a vertical shaft non-rotatively supported by said ceiling mount and depending downwardly therefrom, first and second horizontal hollow arms affixed to said shaft for rotation thereabout, said first arm located above said second arm and being longer than said second arm, a pair of rails located within each of said first and second arms and extending longitudinally thereof, a wheeled carriage for each of said first and second arms, each of said carriages being mounted on said rails of its respective arm for movement therealong, said first and second light source modules being mounted on said carriages of said first and second arms respectively, each of said arms having a bottom surface with an elongated longitudinal slot formed therein, a vertical support assembly rotatably affixed to each of said carriages and depending downwardly therefrom through said slot in its respective one of said horizontal arms, each vertical support assembly terminating in a joint assembly, each joint assembly comprising first and second joint members, a pivot pin pivotally joining said first and second joint members together, and means for releasably locking said second joint member in a plurality of angular positions with respect to said first joint member, said first joint member of each joint assembly being affixed to one of said vertical support assemblies, each of said first and second lightheads being affixed to its respective one of said second joint members, each of said light piping members being rotatable with respect to its respective light source module and extending through its respective vertical support assembly and its respective joint assembly.

29. The lighting system claimed in claim 28 wherein each vertical support assembly comprises an upper member, an intermediate member telescopically receivable in said upper member and a lower member telescopically receivable within said intermediate member, said upper, intermediate and lower members being axially rotatable as a unit with respect to their respective carriage, means to prevent rotation of said upper, intermediate and lower members with respect to each other, said upper member having longitudinal magnetic strips mounted on its inner surface and evenly spaced thereabout, said intermediate member having magnetic means affixed to its outer surface equal in number to and spring biased into abutment with said upper member strips, said intermediate member having longitudinal magnetic strips mounted on its inner surface and evenly spaced thereabout, said lower member having magnetic means affixed to its outer surface equal in number to and spring biased into abutment with said intermediate member strips, said intermediate member being axially shiftable between a retracted position and an extended position with respect to said upper member, and said lower member being shiftable axially between a retracted position and an extended position with respect to said intermediate member, said magnetic strips and abuting magnetic means holding said intermediate and lower members in desired axial positions, said lower telescoping member of each vertical support assembly having a lowermost end, said first joint member of each joint assembly being affixed to the lowermost end of one of said lower telescoping members of said vertical support assemblies.

30. The lighting system claimed in claim 28 including a plurality of lightheads of different sizes and different light directing characteristics, quick connect and disconnect couplings on said lightheads and said second joint members, whereby each of said lightheads can be easily connected to and released from either of said second joint members.

31. The lighting system claimed in claim 29 including a plurality of lightheads of different sizes and different light directing characteristics, quick connect and disconnect couplings on said lightheads and said second joint members, whereby each of said lightheads can be easily connected to and released from either of said second joint members.

32. The lighting assembly claimed in claim 28 wherein said illumination level is at least 1000 lumens.

33. The lighting assembly claimed in claim 28 wherein each of said lightheads has a weight of up to about 10 pounds.

34. The lighting assembly claimed in claim 28 wherein each of said lightheads has a weight of up to about 5 pounds.

35. The lighting assembly claimed in claim 28 wherein each of said lightheads has a thickness of up to about 2 inches.

36. The lighting assembly claimed in claim 28 wherein filter means are located within said light source modules to reduce or eliminate selected wavelengths of said light from said light sources.

37. The lighting assembly claimed in claim 28 wherein filter means are located within said light source modules to adjust the color temperature of said light from said light sources.

38. The lighting assembly claimed in claim 28 wherein said light source in each of said light source modules comprises a point source chosen from the class consisting of an incandescent lamp and a high intensity discharge arc lamp.

39. The lighting assembly claimed in claim 28 wherein said light source of each of said light source modules comprises a metal halide arc lamp.

40. The lighting assembly claimed in claim 28 wherein said light source of each of said first and second light source modules comprises a main light source, a similar back-up light source being so located within each of said light source modules as to have the same performance characteristics as said main light source therein.

41. The lighting assembly claimed in claim 28 wherein said lighting assembly comprises a medical lighting assembly for use in examination procedures, surgical procedures, and dental procedures.

42. The lighting assembly claimed in claim 28 wherein said lighting assembly comprises a surgical lighting assembly for use in an operating room.

* * * * *